United States Patent
Yanagisawa et al.

(10) Patent No.: US 7,839,908 B2
(45) Date of Patent: Nov. 23, 2010

(54) MODE CONTROL WAVEGUIDE LASER DEVICE

(75) Inventors: Takayuki Yanagisawa, Tokyo (JP); Yoshihito Hirano, Tokyo (JP); Syuhei Yamamoto, Tokyo (JP); Masao Imaki, Tokyo (JP); Kiyohide Sakai, Tokyo (JP); Yasuharu Koyata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 335 days.

(21) Appl. No.: 11/579,454

(22) PCT Filed: Mar. 30, 2005

(86) PCT No.: PCT/JP2005/006103
§ 371 (c)(1),
(2), (4) Date: Nov. 2, 2006

(87) PCT Pub. No.: WO2006/103767
PCT Pub. Date: Oct. 5, 2006

(65) Prior Publication Data
US 2008/0095202 A1    Apr. 24, 2008

(51) Int. Cl.
*H01S 3/04* (2006.01)
(52) U.S. Cl. .................. 372/36; 372/18; 372/19; 372/20; 372/21; 372/34; 372/50.11; 372/92; 257/276; 257/625; 257/706; 257/E33.075; 257/E31.131; 257/E23.051; 257/E23.105
(58) Field of Classification Search .............. 372/18, 372/19, 20, 21, 36, 50.11, 92, 34; 257/276, 257/625, 706, E33.075, E31.131, E23.051, 257/E23.105
See application file for complete search history.

(56) References Cited

U.S. PATENT DOCUMENTS 3,868,589 A    2/1975    Wang (Continued)

FOREIGN PATENT DOCUMENTS

DE    42 39 653 A1    6/1994

(Continued)

OTHER PUBLICATIONS

Czeranowsky et al., Optics Communications, 205 (2002), pp. 361-365.

*Primary Examiner*—Tod T Van Roy
*Assistant Examiner*—Yuanda Zhang
(74) *Attorney, Agent, or Firm*—Birch, Stewart, Kolasch & Birch, LLP

(57) ABSTRACT

Provided is a device capable of oscillating a plurality of oscillation modes within a laser medium for obtaining a fundamental wave output which is easy in output scaling and high in luminance, thereby enabling a second harmonic conversion which is high in efficiency. The device includes: a laser medium (5) that is planar, has a waveguide structure in a thickness direction of a cross-section that is perpendicular to an optical axis (6), and has a cyclic lens effect in a direction perpendicular to the optical axis (6) and the thickness direction; a clad (4) that is bonded onto one surface of the laser medium (5); and heat sink (3) that is bonded onto one surface side of the laser medium (5) through the clad (4), and in the device, a laser oscillation includes a laser oscillation that oscillates in a waveguide mode of the laser medium (5), and a laser oscillation that oscillates in a plurality of resonator modes that are generated by a cyclic lens effect of the laser medium (5).

16 Claims, 13 Drawing Sheets

U.S. PATENT DOCUMENTS

| | | | |
|---|---|---|---|
| 5,038,352 A * | 8/1991 | Lenth et al. | 372/21 |
| 5,351,259 A | 9/1994 | Ishimori et al. | |
| 6,055,260 A * | 4/2000 | Byren et al. | 372/72 |
| 6,115,402 A * | 9/2000 | Caprara | 372/101 |
| 6,295,305 B1 * | 9/2001 | Matsumoto et al. | 372/19 |
| 6,738,396 B2 * | 5/2004 | Filgas et al. | 372/19 |
| 6,970,494 B1 * | 11/2005 | Bendett et al. | 372/102 |
| 2002/0056846 A1* | 5/2002 | Tsuda et al. | 257/86 |
| 2003/0072343 A1* | 4/2003 | Murray et al. | 372/50 |
| 2003/0160034 A1 | 8/2003 | Filgas et al. | |
| 2004/0114657 A1* | 6/2004 | Vetrovec | 372/70 |

FOREIGN PATENT DOCUMENTS

| | | |
|---|---|---|
| JP | 49-134348 | 12/1974 |
| JP | 61-75579 A | 4/1986 |
| JP | 4-241484 A | 8/1992 |
| JP | 5-500736 A | 2/1993 |
| JP | 5-121802 A | 5/1993 |
| JP | 5-121803 A | 5/1993 |
| JP | 5-243650 A | 9/1993 |
| JP | 7-335963 A | 12/1995 |
| JP | 2000-77756 A | 3/2000 |
| JP | 2001-223429 A | 8/2001 |
| JP | 2003-309325 A | 10/2003 |
| JP | 3578970 B2 | 7/2004 |
| JP | 2004-296671 A | 10/2004 |
| JP | 2004-349701 A | 12/2004 |
| WO | WO-2005/033791 A1 | 4/2005 |

\* cited by examiner

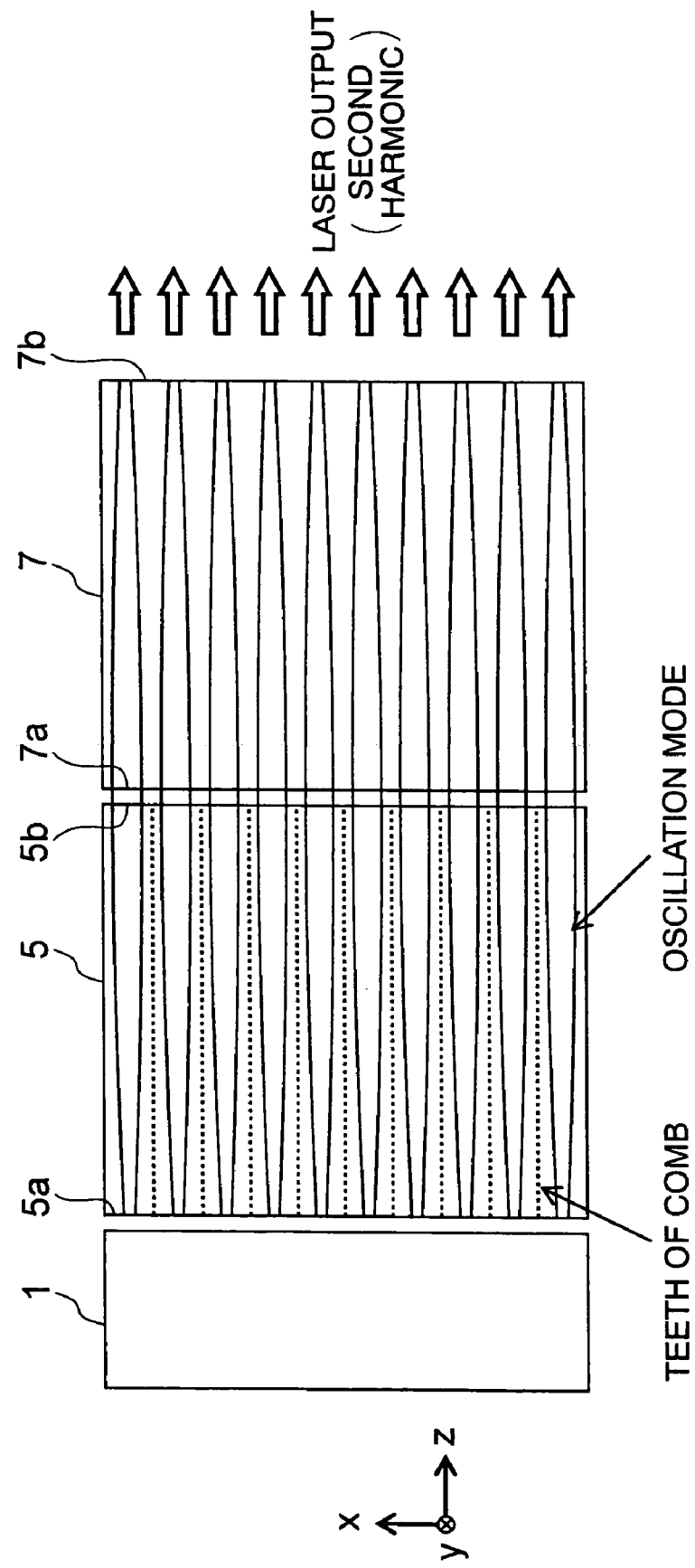

MODE CONTROL WAVEGUIDE LASER DEVICE

TECHNICAL FIELD

The present invention relates to a high-output power laser device suitable for a light source of a printer or a projection television, and a mode control waveguide laser device used in a wavelength conversion laser device.

BACKGROUND ART

A printer or a projection television requires light sources consisting of three colors of R (red), G (green), and B (blue). As the light sources, there has been developed a wavelength conversion laser that conducts second harmonic generation (SHG) by using a nonlinear material, in which laser beams of a 900 nm band, a 1 μm band, and a 1.3 μm band are each a fundamental laser beam. In the SHG, in order to realize a high conversion efficiency to the second harmonic laser beam from the fundamental laser beam, there is required an increased power density of the fundamental laser beam on the nonlinear material, and a high-brightness laser beam that has small wave aberration.

As a method for realizing the wavelength conversion laser device of this type, there is a second harmonic generation laser device within a laser resonator shown in FIG. 15 (for example, refer to Non-patent Document 1). The laser device shown in FIG. 15 includes a pumping semiconductor laser 101 that emits a pumping beam, an optical fiber 102 that transports the pumping beam, a focusing optical system 103 that condenses the pumping beam, a first mirror 105 that reflects the fundamental laser beam and transmits the pumping beam, a laser medium 104, a second mirror 106 that reflects the fundamental laser beam, a third mirror 107 that reflects the fundamental laser beam and transmits the second harmonic laser beam, a nonlinear material 109 that converts the fundamental laser beam into the second harmonic laser beam, and a fourth mirror 108 that reflects the fundamental laser beam and the second harmonic laser beam. Reference numeral 110 denotes a propagation configuration within the resonator of the fundamental laser resonator that is made up of the first mirror and the fourth mirror, and reference numeral 111 denotes an output of the second harmonic laser beam.

In FIG. 15, the pumping beam that is outputted from the pumping semiconductor laser 101 is transported through the optical fiber 102 and outputted. The pumping beam is then adjusted in the optical axis and the beam size so as to coincide with the fundamental propagation configuration 110, and focused by the focusing optical system 103, and absorbed by the laser medium 104. As a result, a gain occurs in the laser medium 104 with respect to the fundamental laser beam, and a resonator that is made up of the first mirror 105 to the fourth mirror 108 generates the laser oscillation of the fundamental laser beam.

In this event, the fundamental laser beam that has been inputted to the nonlinear material 109 is partially converted into the second harmonic laser beam, and outputted to the external as the second harmonic laser beam output 111 by the third mirror 107. The resonator that is made up of the first mirror 105 to the fourth mirror 108 is so structured as to obtain high-brightness laser oscillation with respect to the fundamental laser beam, and realizes high-brightness laser oscillation that is small in wave aberration. Also, as indicated by the propagation configuration 110, the beam size of the fundamental laser beam is reduced by the nonlinear material 109 to increase the power density of the fundamental laser beam, thereby realizing highly-efficient SHG.

Non-patent Document 1: Optics Communications 205 (2002), page 361, issued by Elsevier Corporation.

DISCLOSURE OF THE INVENTION

Problems to be Solved by the Invention

However, the laser device shown in FIG. 15 requires the focusing optical system that inputs the pumping beam, and a large number of mirrors that constitute the resonator, that is, requires a large number of optical parts. Accordingly, there arises a problem in that the device is large-scaled and expensive.

Also, it is necessary to structure the resonator so as to obtain high-brightness laser oscillation. However, because an oscillation mode largely changes due to a thermal lens effect of the laser medium in addition to a length of the resonator, radius of curvature of the mirrors, and a reflective angle, there arises a problem in that it is difficult to obtain a stable laser output.

Also, the alignment adjustment for the spatial resonator using the mirrors is complicated, and also misalignment readily occurs due to external disturbance. As a result, there arises a problem in that it is difficult to obtain high reliability.

Also, it is necessary to increase the exciting light in order to increase the laser output. However, there is a limit to an increase of the output from one optical fiber because the power of the exciting light that can be inputted to the optical fiber is restricted. In addition, in a case where the exciting light is inputted to the laser medium by using the outputs from a plurality of optical fibers, there arises a problem in that it is difficult to increase the second harmonic laser beam output because the structure of the focusing optical system is complicated.

The present invention has been made to solve the above problems, and therefore an object of the present invention is to provide a mode control waveguide laser device that oscillates a plurality of oscillation modes within a laser medium, thereby obtaining a high-brightness fundamental wave output which is easy in output scaling, and enabling a second harmonic conversion with high efficiency.

Means for Solving the Problems

According to present invention, there is provided a mode control waveguide laser device, characterized in that the mode control waveguide laser device includes: a laser medium that is planar, has a waveguide structure in a thickness direction of a cross-section that is perpendicular to an optical axis, and has a cyclic lens effect in a direction that is perpendicular to the optical axis and the thickness direction; a clad that is bonded onto one surface of the laser medium; and a heat sink that is bonded onto one surface side of the laser medium through the clad, and in that the laser oscillation has a laser oscillation that oscillates in a waveguide mode of the laser medium, and a laser oscillation that oscillates in a plurality of resonator modes that are generated by the cyclic lens effect of the laser medium.

EFFECTS OF THE INVENTION

According to the present invention, the plurality of oscillation modes are oscillated within the laser medium, thereby obtaining a fundamental wave output which is easy in output

BRIEF DESCRIPTION OF THE DRAWINGS

[FIG. 4] A diagram for explaining an operation of a mode control waveguide laser device according to Embodiment 1 of the present invention.

BEST MODES FOR CARRYING OUT THE INVENTION

Hereinafter, in order to describe the present invention with more detail, a description will be given of the best mode for carrying out the present invention with reference to the accompanying drawings.

Embodiment 1

Figure 1:
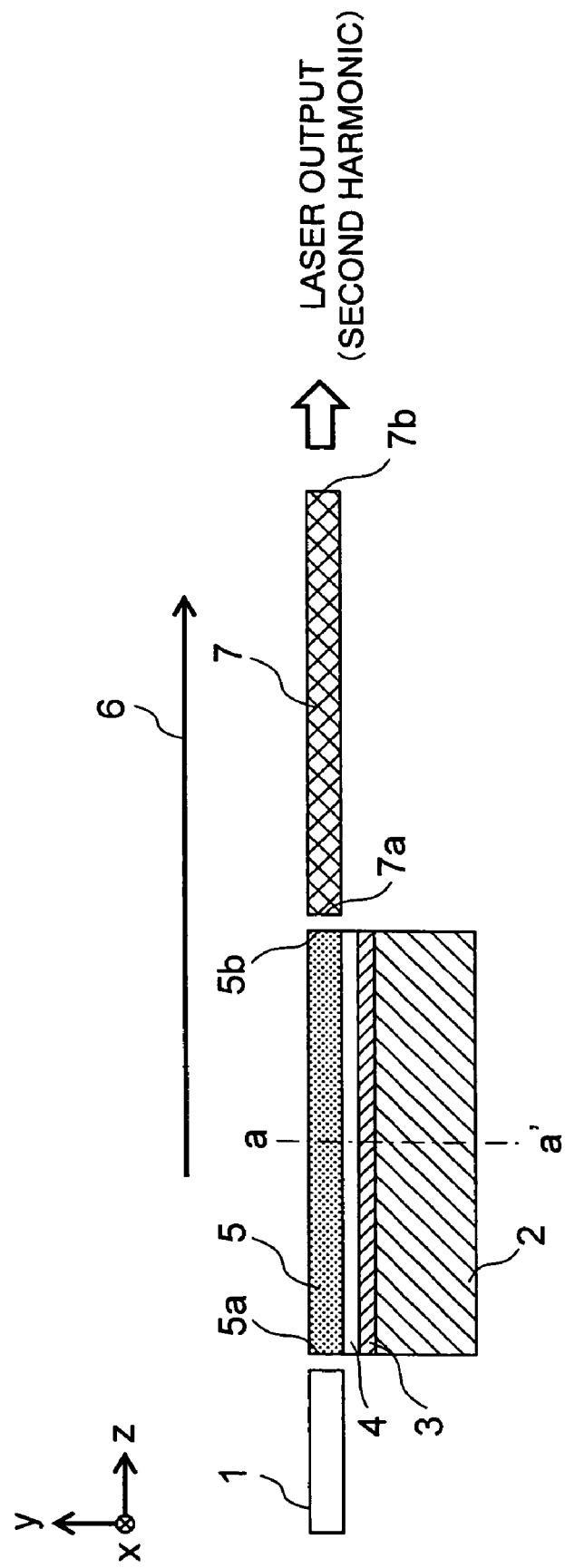
[FIG. 1] A side view showing a structure of a mode control waveguide laser device according to Embodiment 1 of the present invention.
Figure 2:
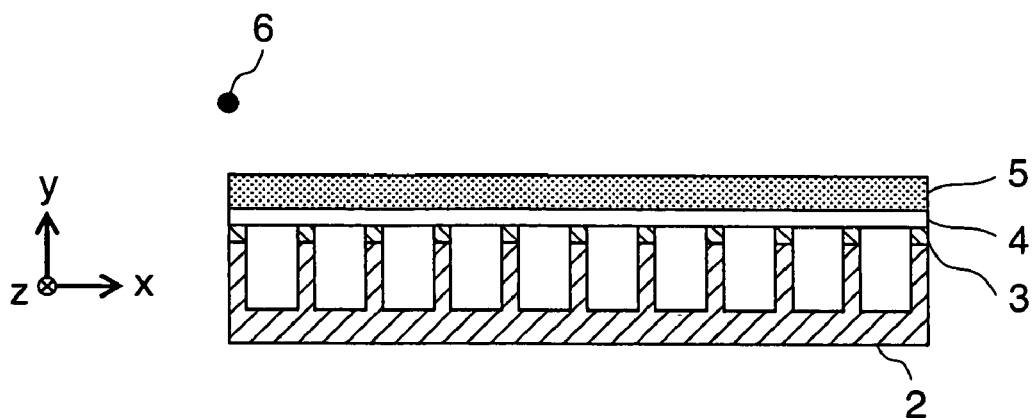
[FIG. 2] A cross-sectional view taken along a line a-a' of FIG. 1 from a nonlinear material side.

FIGS. 1 and 2 are diagrams showing a structure of a mode control waveguide laser device according to Embodiment 1 of the present invention. FIG. 1 is a side view, and FIG. 2 is a cross-sectional view of a line a-a', viewed from a nonlinear material side.

A mode control waveguide laser oscillator shown in FIGS. 1 and 2 includes: a semiconductor laser 1; a laser medium 5 that is tabular, has a waveguide structure in a thickness direction of a cross-section perpendicular to an optical axis 6 representative of a laser oscillating direction, and has a cyclic lens effect in directions perpendicular to the optical axis 6 and the thickness direction; a clad 4 that is bonded onto a lower surface of the laser medium 5; a heat sink 2 that is bonded onto a lower surface of the clad 4 which is bonded onto the lower surface of the laser medium 5 with a bonding agent 3; and a nonlinear material 7 that is disposed in the proximity of the optical axis of the laser medium and has a waveguide structure in the same direction as that of the waveguide structure of the laser medium 5.

The laser medium 5 has end surfaces 5a and 5b perpendicular to the optical axis 6, which are, for example, rectangular, and typically has the sizes of several to several tens μm in the thickness in a y-axial direction, and several hundreds μm to several mm in the width in an x-axial direction. For explanation, there is used a coordinate system having the x-axis in a long side direction of the rectangle, the y-axis in a short side direction, and a z-axis in a direction of the optical axis 6. The short sides of the end surfaces 5a and 5b of the laser medium 5 may be round and may not always be rectangular.

The clad 4 has the refractive index smaller than that of the laser medium 5, and is bonded onto one surface that is parallel to a plane x-z of the laser medium 5. The clad 4 is, for example, structured by depositing a coating which is made of an optical material as a raw material, or by optically bonding the optical material to the laser medium 5 by optical contact or diffusion bonding. Also, there may be used an optical adhesive having the refractive index smaller than that of the laser medium 5.

The heat sink 2 is made of a material having high thermal conductivity, and is comb-shaped in a cross-section (plane x-y) that is perpendicular to the optical axis 6. The leading portions of the teeth of the comb of the heat sink 2 are bonded onto the clad 4 through the bonding agent 3.

The bonding agent 3 remove heat that has been generated by the laser medium 5 to the heat sink 2 through the clad 4. The bonding agent 3 can be realized by a metal solder, an optical adhesive, a thermal conductive adhesive, or the like. A surface of the bonding agent 3 which faces a surface of the clad 4 onto which the laser medium 5 is bonded may be metalized (a metal coating is adhered) in order to enhance the bonding strength of the clad 4 with the bonding agent 3. Also, in the case where the heat sink 2 is made of the optical material, the clad 4 and the heat sink 2 may be bonded directly onto each other, for example, by optical contact or diffusion bonding.

Also, the semiconductor laser 1 is disposed in the proximity of the end surface 5a of the laser medium 5, and may be bonded with a cooling heat sink (not shown) as needed. The size of the semiconductor laser 1 in the x-axial direction is substantially equal to the size of the laser medium 5 in the x-axial direction, and the excited light is substantially uniformly outputted in the x-axial direction. The excited light that has been outputted from the semiconductor laser 1 is inputted to the laser medium 5 from the end surface 5a in the direction of the plane xz, and absorbed by the laser medium 5.

The nonlinear material 7 has a cross-section perpendicular to the optical axis 6 which is substantially identical in configuration with the laser medium 5, and has end surfaces 7a and 7b that are perpendicular to the optical axis 6, and the end surface 7a is disposed in the proximity of the end surface 5b of the laser medium 5.

In this example, the end surface 5a of the laser medium 5 is coated with a total reflection coating that reflects the fundamental laser beam, the end surface 5b is coated with an antireflection coating that transmits the fundamental laser beam, the end surface 7a of the nonlinear material 7 is coated with an optical coating that transmits the fundamental laser beam and reflects the second harmonic laser beam, and the end surface 7b is coated with an optical coating that reflects the fundamental laser beam and transmits the second harmonic laser beam. The total reflection coating, the partial reflection coating, and the optical coatings are structured, for example, by laminating dielectric thin coatings. In the case where the excited light that is outputted from the semiconductor laser 1 is inputted from the end surface 5a of the laser medium 5, the total reflection coating of the end surface 5a is an optical coating that transmits the excited light and reflects the fundamental laser beam.

A general solid laser material can be used as the laser medium 5. For example, Nd:YAG, Nd:YLF, Nd:Glass, Nd:YVO$_4$, Nd:GdVO$_4$, Yb:YAG, Yb:YLF, Yb:KGW, Yb:KYW, Er:Glass, Er:YAG, Tm:YAG, Tm:YLF, Ho:YAG, Ho:YLF, Tm, Ho:YAG, Tm, Ho:YLF, Ti:Sapphire, Cr:LiSAF, or the like can be used.

Also, a general wavelength conversion material can be used as the nonlinear material 7. For example, KTP, KN, BBO, LBO, CLBO, LiNbO$_3$, LiTaO$_3$, or the like can be used. Also, when MgO-doped LiNbO$_3$, MgO-doped LiTaO$_3$, stoichiometric LiNbO$_3$, and stoichiometric LiTaO$_3$ which are resistant to optical damage are used, the power density of the inputted fundamental laser beam increases, thereby making it possible to execute a high efficiency wavelength conversion. In addition, when MgO-doped LiNbO$_3$, MgO-doped LiTaO$_3$, stoichiometric LiNbO$_3$, stoichiometric LiTaO$_3$, or KTP which has a periodically poled structure is used, nonlinear constant increases, thereby making it possible to execute a further high efficiency wavelength conversion.

Figure 3:
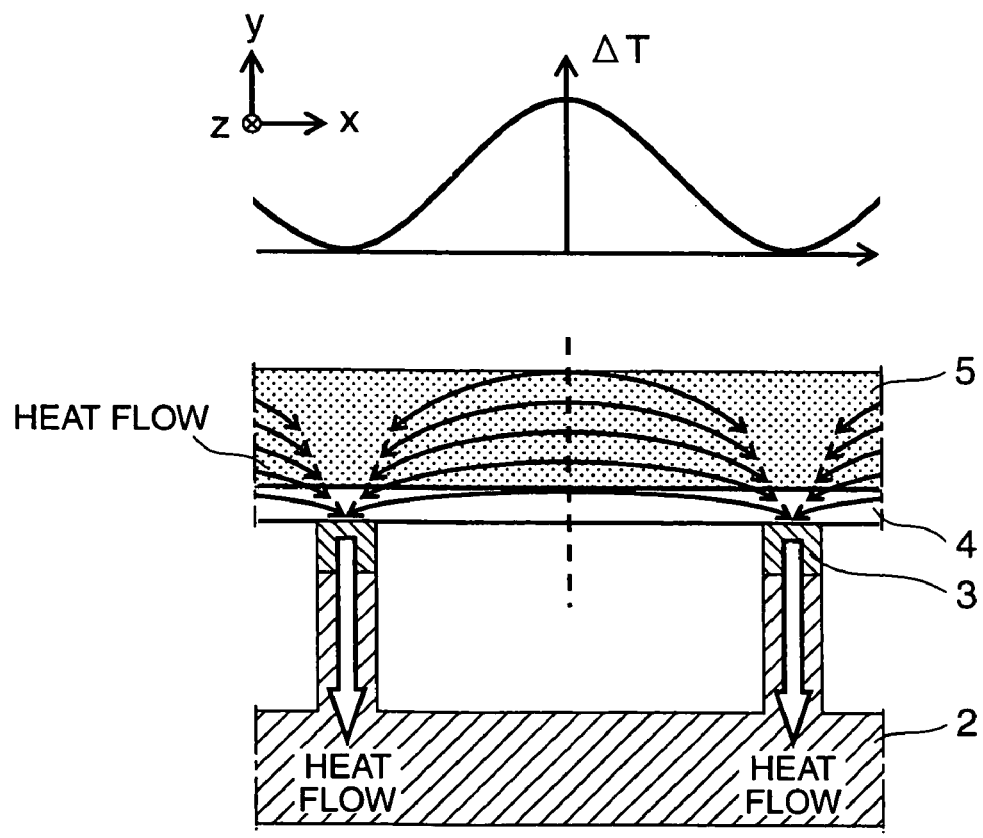
[FIG. 3] A partially enlarged view showing a cross-section of a heat sink 2 to a laser medium 5 in FIG. 2 explaining a temperature distribution that occurs in the laser medium 5.

Next, a description will be given of a temperature distribution that occurs in the laser medium 5 with reference to FIG. 3. FIG. 3 is a partially enlarged diagram of the cross-sectional view of the heat sink 2 to the laser medium 5 shown in FIG. 2. The laser medium 5 partially converts the power of the absorbed excited light into heat to generate heat. The heat thus generated is exhausted to the heat sink 2 through the clad 4 and the bonding agent 3.

In this situation, because the heat sink 2 is comb-shaped, and a range bonded by the bonding agent 3 is only the leading portions of the teeth of the comb, a heat flow occurs at both sides in the x-axial direction from substantially the center of the two teeth of the comb in the middle portion between the two teeth of the comb. Accordingly, a temperature of substantially the center of the two teeth of the comb reaches maximum, and the temperature is lowered toward the teeth of the comb.

The optical material such as the laser medium 5 changes the refractive index substantially in proportion to a temperature difference. In a case where a material that is positive in a refractive index change dn/dT per unit temperature is used as the optical material of the laser medium 5, the refractive index of the center portion of the two teeth of the comb which is high in the temperature increases, and the refractive index becomes smaller toward the portion of the teeth of the comb. As a result, the thermal lens effect, with the center portion of the two teeth of the comb as the optical axis, occurs in the x-axial direction.

The excited light caused by the semiconductor laser 1 which is inputted to the laser medium 5 is substantially uniformly excited in the x-axial direction, and the teeth of the comb of the heat sink 2 are arranged at substantially regular intervals in the x-axial direction. Therefore, the thermal lens effect also cyclically occurs, and when the number of teeth of the comb is m, there can be obtained an effect that (m−1) lenses are arranged at substantially regular intervals. The intensity and cycle of the thermal lens effect that cyclically occurs can be arbitrarily adjusted according to: the intervals of the teeth of the comb, the thickness of the teeth of the comb, the length of the teeth of the comb, and the thermal conductivity of the heat sink 2; the thermal conductivity and the thickness of the bonding agent 3; and the material and the thickness of the clad 4.

Likewise, in a case where a material, whose refractive index change dn/dT per unit temperature is negative, is used as the optical material of the laser medium 5, there appears a refractive index distribution contrary to the temperature distribution, in which the refractive index of the portion that is bonded to the comb increases and the refractive index of the center portion of the two teeth of the comb decreases. As a result, the thermal lens effect, with the portion that is bonded to the comb as the optical axis, occurs in the x-axial direction. In this case, when the number of teeth of the comb is m, there can be obtained an effect that m lenses are disposed at substantially regular intervals.

In addition, gaps between the respective teeth of the heat sink 2 are normally filled with air, but may be filled with a heat insulation material having the thermal conductivity smaller than that of the heat sink 2. In this case, in the refractive index distribution within the laser medium 5, a cyclic temperature distribution that occurs due to a difference in thermal conductivity between the leading ends of the teeth of the comb and the heat insulation material is generated.

With the above structure, the intensity and the distribution of the thermal lens effect can be further finely adjusted. Also, the gaps between the respective teeth of the comb are filled with the heat insulation material, thereby making it possible to enhance rigidity of the heat sink 2. Because the same effect is obtained irrespective of positive/negative of dn/dT, description will be given of a case in which dn/dT is positive so far as there is no specific description below.

Next, a description will be given of the operation of a mode control waveguide laser device according to Embodiment 1 with reference to FIG. 4.

FIG. 4 is a diagram showing the laser device shown in FIG. 1, viewed from the z-axial direction. Here, in order to clarify a relationship between the oscillation mode of the fundamental laser beam and the teeth of the comb of the heat sink 2, the teeth of the comb are indicated by dotted lines so as to visually confirm portions of the teeth of the comb of the heat sink 2.

The excited light that is inputted from the side surface 5a of the laser medium 5 is absorbed by the laser medium 5, and a gain with respect to the fundamental laser beam is generated within the laser medium 5. The gain that has been generated within the laser medium 5 allows the fundamental laser beam to conduct laser oscillation between the end surface 5a that is perpendicular to the optical axis 6 of the laser medium 5 and the end surface 7b of the nonlinear material 7.

The crystal axis angle, the temperature, or the cycle of the cycle inversion polarization is optimized so that the fundamental laser beam that has been inputted to the nonlinear material 7 is converted into the second harmonic laser beam by the nonlinear effect. Accordingly, when the fundamental laser beam that oscillates between the end surface 5a and the end surface 7a is inputted to the nonlinear material 7, a part of the fundamental laser beam is converted into the second harmonic laser beam and outputted to the external from the end surface 7b.

Also, the fundamental laser beam that remains without being converted into the second harmonic laser beam is totally reflected by the end surface 7b, and again passes through the nonlinear material 7 so as to be converted into the second harmonic laser beam. The second harmonic laser beam into which a part of the residual fundamental laser beam has been converted is totally reflected by the end surface 7a and outputted to the external from the end surface 7b.

The thickness of the laser medium 5 in the y-axial direction is about several to several tens of times of a wavelength, and is interposed between the clad 4, having smaller refractive index than the laser medium 5, and air. Therefore, the laser medium 5 operates as a waveguide in which the fundamental laser beam is confined in the laser medium 5, having high refractive index, and the fundamental laser beam selectively oscillates in a mode of the waveguide. The mode of the waveguide can be arbitrarily set by adjusting the refractive index of the clad 4 and the thickness of the laser medium 5 in the y-axial direction, thus, high-brightness oscillation can be realized by guiding only a lower-order mode or a single mode. The refractive index distribution also occurs in the y-axial direction according to the thermal distribution that is generated due to heat flow. However, when the refractive index difference between the clad 4 and the laser medium 5, and the refractive index difference between the air and the laser medium 5 are sufficiently lager than a refractive index change caused by the thermal distribution, the mode of the waveguide becomes ascendant, and an influence of the heat can be ignored.

The upper and lower surfaces of the nonlinear material 7 which are perpendicular to the y axis is interposed between air or a clad (not shown) having the refractive index smaller than that of the nonlinear material 7, and the thickness of the nonlinear material 7 is about several to several tens of times of the wavelength. As a result, the nonlinear material 7 operates as the waveguide in the y-axial direction similar to the laser medium 5. Also, in the case where the nonlinear material 7 absorbs the laser beam and generates heat, a heat sink may be bonded to the lower surface of the nonlinear material 7 or the clad that is bonded to the nonlinear material 7 to exhaust the heat.

In the case where the heat sink is directly bonded to the nonlinear material 7, an optical material having the refractive index smaller than that of the nonlinear material 7 is used for the heat sink material, or a bonding agent having the refractive index smaller than that of the nonlinear material 7, for example, an optical adhesive is used so as to use the y-axial direction of the nonlinear material 7 as the waveguide.

The laser oscillation in the y-axial direction within the laser resonator selectively oscillates in the mode of the waveguide of the laser medium 5 or the nonlinear material 7. The waveguide mode of the laser medium 5 and the waveguide mode of the nonlinear material 7 can be arbitrarily set according to the refractive index difference between the thickness and the clad, respectively, and only the lower-order mode or the single mode is so guided as to realize the high-brightness oscillation.

The waveguide mode of the laser medium 5 and the waveguide mode of the nonlinear material 7 do not necessarily coincide with each other. For example, in the case where one of the waveguide modes is set as a multiple mode and the other waveguide mode is set as the single mode, the laser oscillation mode is restricted by the lowest-order mode, thereby making it possible to selectively oscillate by the single mode. It is needless to say that the modes may be structured to be the same waveguide mode.

In the laser oscillation in the x-axial direction within the laser resonator, because the widths of the laser medium 5 and the nonlinear material 7 are sufficiently lager than the wavelengths of the fundamental laser beam and the second harmonic laser beam, the waveguide modes are not selected, thereby resulting in a spatial resonator. In the laser medium 5, the thermal lens effect with the center of the two teeth of the comb as an optical axis cyclically occurs due to the comb-shaped structure of the heat sink 2. On the other hand, in the x-axial direction of the nonlinear material 7, because no refractive index distribution exists, propagation is conducted in a free space.

Accordingly, the laser oscillation mode is given by the thermal lens that is generated by the laser medium 5 to generate independent oscillation modes in the respective optical axes. The intensity and the cycle of the thermal lens of the laser medium 5 are adjusted so that the independent respective oscillation modes become only the lower-order mode or the single mode in the resonator including the nonlinear material 7, thereby making it possible to realize high-brightness oscillation.

In the comb-shaped structure of the heat sink 2, the teeth of the comb are not necessarily provided at regular intervals. For example, in the case where the distribution exists in the output of the semiconductor laser 1 in the x-axial direction, the intervals of the teeth of the comb are changed according to calorific power, thereby making it possible to realize high-brightness oscillation in any oscillation modes of the laser medium 5.

With the above structure, because the x-axial direction of the laser medium 5 and the nonlinear material 7 form the spatial resonator, it is possible to freely set the width of the x-axial direction. Also, since no high beam quality is required in the x-axial direction of the semiconductor laser 1, the widths of the laser medium 5 and the nonlinear material 7 are adjusted in accordance with the width of the semiconductor laser 1 in the x-axial direction, thereby making it possible to freely set the width of the semiconductor laser 1 in the x-axial direction.

Accordingly, the output of the second harmonic laser beam with high output is realized by causing the output of the excited light to become high by using a broad area LD that facilitates high output and has a light emission region broad in width, or an LD array having emitters arranged in a line.

Also, since the thickness of the laser medium 5 in the y-axial direction becomes thin and the power density of the fundamental laser beam that is inputted to the nonlinear material 7 becomes high, the second harmonic laser beam can be outputted with high efficiency.

Also, since the thickness of the laser medium 5 in the y-axial direction becomes thin and the power density of the excited light becomes high, high gain can be obtained by using a laser medium that is small in gain or a three-level laser medium that is large in lower level absorption. As a result, the fundamental laser beam can be outputted with high efficiency.

Also, since the thickness of the laser medium 5 in the y-axial direction becomes thin and the power density of the excited light becomes high, high gain can be obtained by using a laser medium that is small in gain or a three-level laser medium that is large in lower level absorption. As a result, the fundamental laser beam can be oscillated with high efficiency, thereby making it possible to output the second harmonic laser beam with high efficiency.

Also, since the thickness of the laser medium 5 in the y-axial direction is thin, a temperature rise of the laser medium 5 becomes small and the fundamental laser beam can be outputted with high efficiency by using the three-level laser medium that causes deterioration of the gain due to the temperature rise. As a result, it is possible to output the second harmonic laser beam with high efficiency.

Also, since the semiconductor laser 1, the laser medium 5, and the nonlinear material 7 can be disposed in the proximity of each other, the focusing optical system for the excited light as well as the lenses and the mirrors that constitute the resonator are not required, thereby making it possible to structure the laser device that is small in size and inexpensive.

Also, in the waveguide type laser device shown in FIG. 1, the laser oscillation frequently obtains linear polarization due to a gain/loss ratio of the waveguide mode. Accordingly, even in the case of using the nonlinear material 7 that requires the linear polarization for the fundamental laser beam, the second harmonic laser beam can be outputted with high efficiency.

In addition, when there is used a laser medium (a laser medium whose host consists of crystals having a double refraction such as YLF, YVO$_4$, GdVO$_4$, KGW, KYW, Sapphire, or the like), the linear polarization oscillation in the higher direction of the gain can be readily obtained. Therefore, even in the case of using the nonlinear material 7 that requires the linear polarization for the fundamental laser beam, the second harmonic laser beam can be outputted with high efficiency.

Also, in the laser device shown in FIG. 1, oscillation occurs due to a plurality of longitudinal modes that are slightly different in the wavelength within a range in which the laser medium 5 has the gain. In the wavelength conversion including SHG, in the case where the oscillation wavelength band of the fundamental laser beam is broad, the conversion efficiency is deteriorated due to the phase mismatching. Accordingly, in order to realize the high conversion efficiency, the fundamental laser beam having the narrow wavelength band is required, and oscillation due to the single longitudinal mode is desirable.

In a standing-wave type laser resonator, because the standing wave is formed within the resonator, there exist nodes at which a field intensity is zero, and antinodes at which the field intensity is maximum. When the wavelengths are different from each other, the positions of the nodes and the antinodes of the standing waves of the respective wavelengths are displaced. As a result, when losses are cyclically given to the direction of the optical axis 6, the losses and the electric field are superimposed on each other, thereby making it possible to give different losses to the respective wavelengths, and also making it possible to selectively oscillate only a desired wavelength.

Also, in the mode control waveguide laser device shown in FIG. 1, the y-axial direction oscillates in the mode of the waveguide which is confined inside of the laser medium 5, but the electric field due to seeping slightly exists within the clad 4. Therefore, the cyclic loss is given to the clad 4, thereby making it possible to selectively oscillate only the desired wavelength. Also, when the refractive index of the clad 4 cyclically changes, the trapping intensity of the laser beam within the laser medium 5 changes, resulting in that the same effect as in the case where the loss is cyclically given is obtained.

As a method for giving the loss to the clad 4, there is a method of adding ions that absorb the laser beam to the clad 4, and Cr4+ may be cyclically added to the laser beam of 1 μm. As a method of giving the refractive index change to the clad 4, the method can be realized by, for example, irradiating the clad 4 with an interference light of the laser beam that is high in intensity, and cyclically changing the refractive index.

With the above structure, since only the desired wavelength can be selectively oscillated, it is possible to obtain the oscillation of the fundamental laser beam that is suitable for the wavelength conversion.

In addition, in the case where the laser medium 5 is made of a laser medium having the gain in the plurality of wavelengths, because the thickness of the laser medium 5 in the y-axial direction is thin, very large gains are generated in the respective wavelengths. For that reason, when the wavelengths other than the desired wavelength are generated by the end surface 5b of the laser medium 5 or the end surfaces 7a and 7b of the nonlinear material 7, there is a case in which the laser oscillation (parasitic oscillation) of unnecessary wavelengths occurs between the end surface 5a and the reflection surface. In the mode control waveguide laser device shown in FIG. 1, the y-axial direction oscillates in the mode of the waveguide which is confined inside of the laser medium 5, but the electric field due to seeping slightly exists within the clad 4.

Therefore, when the clad 4 is made of a material that transmits the desired wavelength and absorbs unnecessary wavelengths, it is possible to increase the loss of the unnecessary wavelengths and suppress the parasitic oscillation. In order to absorb the unnecessary wavelengths by the clad 4, for example, ions that do not absorb the desired wavelength but absorb the unnecessary wavelengths may be added to glass or crystal.

In addition, in the waveguide laser device shown in FIG. 1, because the thickness of the laser medium 5 in the y-axial direction is thin, very large gain occurs. For that reason, when the fundamental laser beam is slightly reflected by the end surface 5b or the end surface 7a which transmit the fundamental laser beam, there is a case in which the unnecessary laser oscillation (parasitic oscillation) occurs between the reflective surface and the end surface 5a.

On the other hand, in the waveguide laser device shown in FIG. 1, it is unnecessary for the end surfaces 5b and 7a to be parallel to the end surfaces 5a and 7b, and the end surfaces 5b and 7a may be inclined with respect to the optical axis that is given by the thermal lens that is generated by the laser medium 5. In this case, the optical axis refracted by the inclined end surface changes the angle when the optical axis passes through the inclined end surface. However, when the end surfaces 5a and 7a are located perpendicularly to the optical axis whose angle has been changed, the same effects as that described above can be obtained.

With the above structure, even when the fundamental laser beam is reflected by the end surface 5b or 7a, the stable resonator cannot be structured between the above end surface and the end surface 5a, thereby making it possible to suppress the parasitic oscillation.

In addition, in the waveguide laser device shown in FIG. 1, because the thickness of the laser medium in the y-axial direction is thin, very large gain occurs. For that reason, there is a case in which the laser beam that has been reflected by the end surfaces 5a and 5b is reflected by the surface of the clad 4 which is bonded onto the heat sink and an upper surface of the laser medium 5, thereby causing the parasitic oscillation in a mode that is different from the desired waveguide mode. Under the circumstances, an absorbing coating that absorbs the laser beam is coated on the surface of the clad 4 which is bonded to the heat sink, and the loss of the laser beam in a mode different from the desired waveguide mode is so increased as to suppress the parasitic oscillation. The absorbing coating may be made of a material having the absorption with respect to the laser beam wavelength of the parasitic oscillation. For example, a Cr metal coating may be used. With the above structure, since the desired waveguide mode allows the electric field to slightly seep into the laser medium 5 and the clad 4, the loss due to the absorbing coating does not occur, and the parasitic oscillation can be suppressed.

Also, in the above laser device, the end surface 7a is coated with an optical coating that transmits the fundamental laser beam and reflects the second harmonic laser beam. Alternatively, the same effects as that described above can be obtained even when the end surface 5a is coated with a total reflective coating that totally reflects the fundamental laser beam and the second harmonic laser beam, and the end surface 7a is coated with an antireflective coating that transmits the fundamental laser beam and the second harmonic laser beam.

Also, the semiconductor laser 1 is disposed in the proximity of the end surface 5a of the laser medium 5. Alternatively, the semiconductor laser 1 may be disposed in the proximity of a side surface that is in parallel to the y-z surface. With the above structure, because the leakage light of the fundamental laser beam is not inputted directly to the semiconductor laser 1, the possibility of damaging the semiconductor laser 1 is reduced, and the laser device with high reliability can be structured.

The surface opposite to the surface of the laser medium 5 which is bonded to the clad 4 is in contact with the air. Alternatively, the surface may be bonded to a second clad having a refractive index that is smaller than the laser medium 5.

With the above structure, the refractive index difference between the laser medium 5 and the second clad is adjusted, thereby making it possible to arbitrarily adjust the propagation mode of the laser medium 5 in the y-axial direction. Also, when the thickness of the second clad in the y-axial direction is thickened, it is possible to increase the rigidity of the laser medium 5 without an influence on the waveguide mode of the laser medium 5.

Also, the surface opposite to the surface of the laser medium 5 which is bonded onto the clad 4 is in contact with the air. Alternatively, the surface may be bonded onto the substrate through a second bonding agent having a refractive index that is smaller than that of the laser medium 5. The second bonding agent is made of, for example, an optical adhesive. Also, the substrate is made of, for example, an optical material or metal.

With the above structure, the refractive index difference between the laser medium 5 and the bonding agent is adjusted, thereby making it possible to arbitrarily adjust the propagation mode of the laser medium 5 in the y-axial direction. Also, when the thickness of the substrate in the y-axial direction is thickened, it is possible to enhance the rigidity of the laser medium 5 without an influence on the waveguide mode of the laser medium 5.

In addition, in the case where the thermal expansion occurs due to the temperature rise of the laser medium 5, since the optical adhesive is lower in the rigidity than crystal or glass material, the optical adhesive is deformed according to the expansion of the laser medium 5, thereby making it possible to alleviate a stress that is exerted on the laser medium 5.

Further, the surface opposite to the surface of the laser medium which is bonded onto the clad 4 is in contact with the air. Alternatively, it is possible that the surface is coated with an optical coating having a refractive index that is smaller than that of the laser medium 5, and the surface of the optical coating is bonded onto a substrate having substantially the same thermal expansion coefficient as that of the laser medium 5 through optical contact or diffusion bonding.

With the above structure, the refractive index difference between the laser medium 5 and the optical coating is adjusted, thereby making it possible to arbitrarily adjust the propagation mode of the laser medium 5 in the y-axial direction. Also, when the thickness of the substrate in the y-axial direction is thickened, it is possible to enhance the rigidity of the laser medium 5 without an influence on the waveguide mode of the laser medium 5.

Further, in the case where the thermal expansion occurs due to the temperature rise of the laser medium 5, since the laser medium 5 and the substrate are substantially identical in the thermal expansion ratio with each other, the substrate also expands at substantially the same rate. In this situation, since the optical coating is lower in the density and in the rigidity than crystal or glass material, the optical coating is deformed according to the expansion of the substrate, thereby making it possible to alleviate the stress that is exerted on the laser medium 5. In addition, when the optical coating and the substrate are bonded onto each other, the optical coating material and the substrate which are optically bonded onto each other with ease are selected, thereby making it possible to enhance the bonding intensity.

Further, it is difficult to manufacture the above laser medium 5 alone because the thickness of the laser medium 5 is several to several tens μm. Under the circumstances, it is possible to manufacture the laser medium 5, for example, through a method shown in FIGS. 5A to 5F.

Figure 5A:
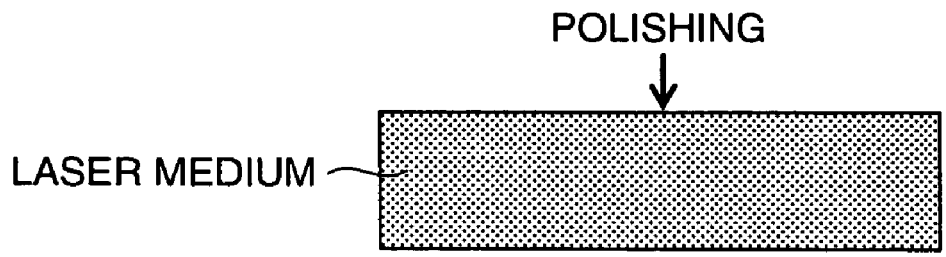
[FIG. 5A] A diagram for explaining a process of producing a waveguide into which a substrate, a laser medium, a clad, and a heat sink are integrated together at the same time, and showing a step of polishing the laser medium.

In FIG. 5A, one surface of the laser medium 5 is first polished.

Figure 5B:
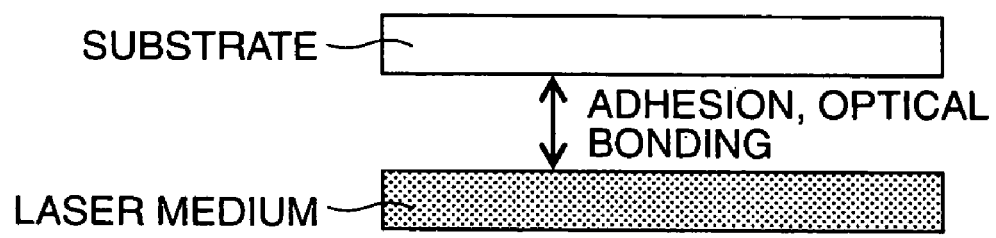
[FIG. 5B] A diagram showing a step of bonding the substrate and the laser medium subsequently to the step of FIG. 5A.

In FIG. 5B, the surface polished in FIG. 5A is directly bonded onto a substrate having the refractive index that is smaller than that of the laser medium 5 through an optical contact or diffusion bonding, or bonded onto a substrate that is made of metal or an optical material using an optical adhesive having the refractive index that is smaller than that of the laser medium 5. Alternatively, after the laser medium is coated with an optical coating having the refractive index that is smaller than that of the laser medium 5, the substrate is bonded onto the optical coating through the optical contact or the diffusion bonding.

Figure 5C:
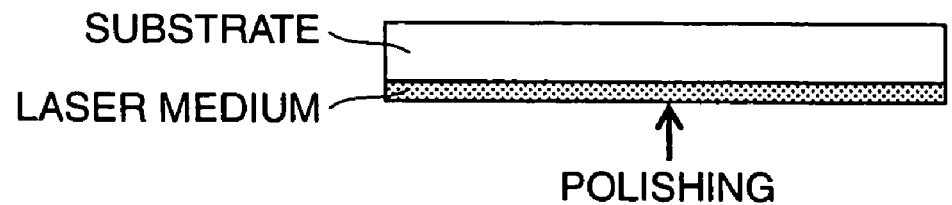
[FIG. 5C] A diagram showing a step of polishing the laser medium subsequently to the step of FIG. 5B.

In FIG. 5C, the surface opposite to the surface of the laser medium 5 which is bonded onto the substrate is polished to provide a desired thickness of the laser medium 5.

Figure 5D:
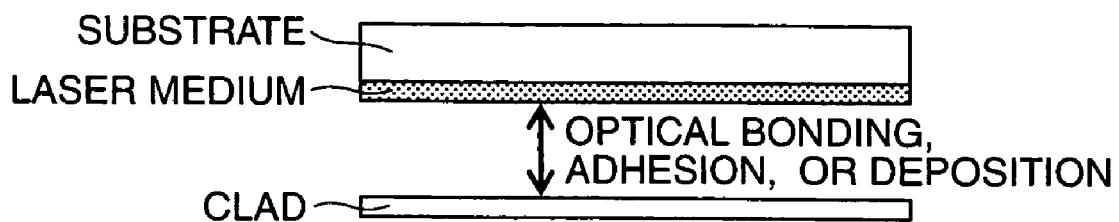
[FIG. 5D] A diagram showing a step of bonding the clad subsequently to the step of FIG. 5C.

In FIG. 5D, the clad 4 having the refractive index that is smaller than that of the laser medium 5 is deposited, or bonded through the optical bonding or the optical adhesive, to manufacture a waveguide having the substrate, the laser medium 5, and the clad 4 integrated together.

Figure 5E:
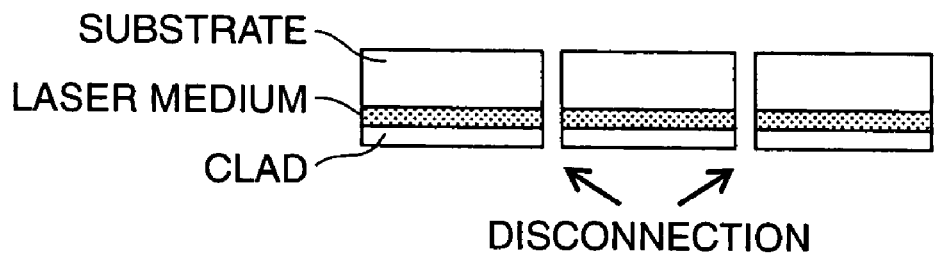
[FIG. 5E] A diagram showing a step of cutting the integrated waveguide subsequently to the step of FIG. 5D.

In FIG. 5E, the integrated waveguide is cut to produce a plurality of waveguides each having a desired size.

Figure 5F:
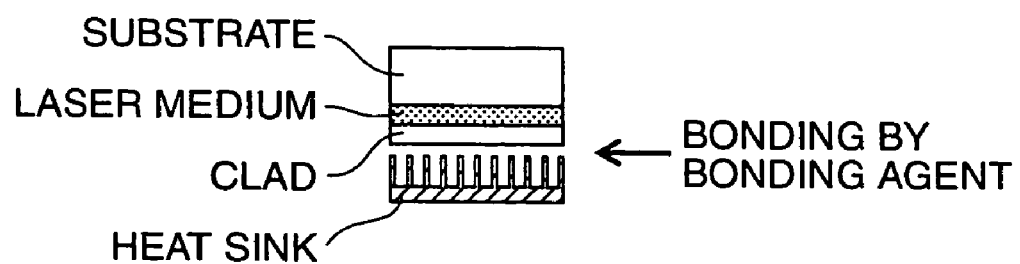
[FIG. 5F] A diagram showing a step of bonding the clad and the heat sink together subsequently to the step of FIG. 5E.

In FIG. 5F, the clad 4 and the heat sink 3 are bonded onto each other by using a bonding agent.

With the above operation, it is possible to manufacture a large number of integrated waveguides at the same time, and it is possible to reduce the manufacturing costs. After manufacturing, when the rigidity of the single laser medium 5 is sufficient, the substrate may be removed.

In addition, it is possible that the laser medium 5 and the clad 4 are made of the same host material. In general, in the case where active ions are added to the host material to manufacture a laser medium, the host material and the laser medium slightly change their refractive indexes. For that reason, a host material whose refractive index becomes high by addition of the active ions is used, the active ions are added only to the region of the laser medium 5, and the active ions are not added to the clad 4. As a result, the same effects are obtained.

With the above structure, in the case where the laser medium 5 and the clad 4 are optically bonded onto each other through the optical contact or the diffusion bonding, a high bonding strength is obtained because the materials of the same type are bonded together. Also, it is possible to manufacture the laser medium 5 to which the active ions are added and the clad 4 to which the active ions are not added integrally through a ceramic manufacturing method in which crystal is crushed into particles and compression-molded before being sintered. In addition, in the case where the ceramic manufacturing method is used, because the active ions can be added with a high density compared with crystal, it is possible to increase the absorption efficiency and the gain of the laser medium 5.

Figure 6:
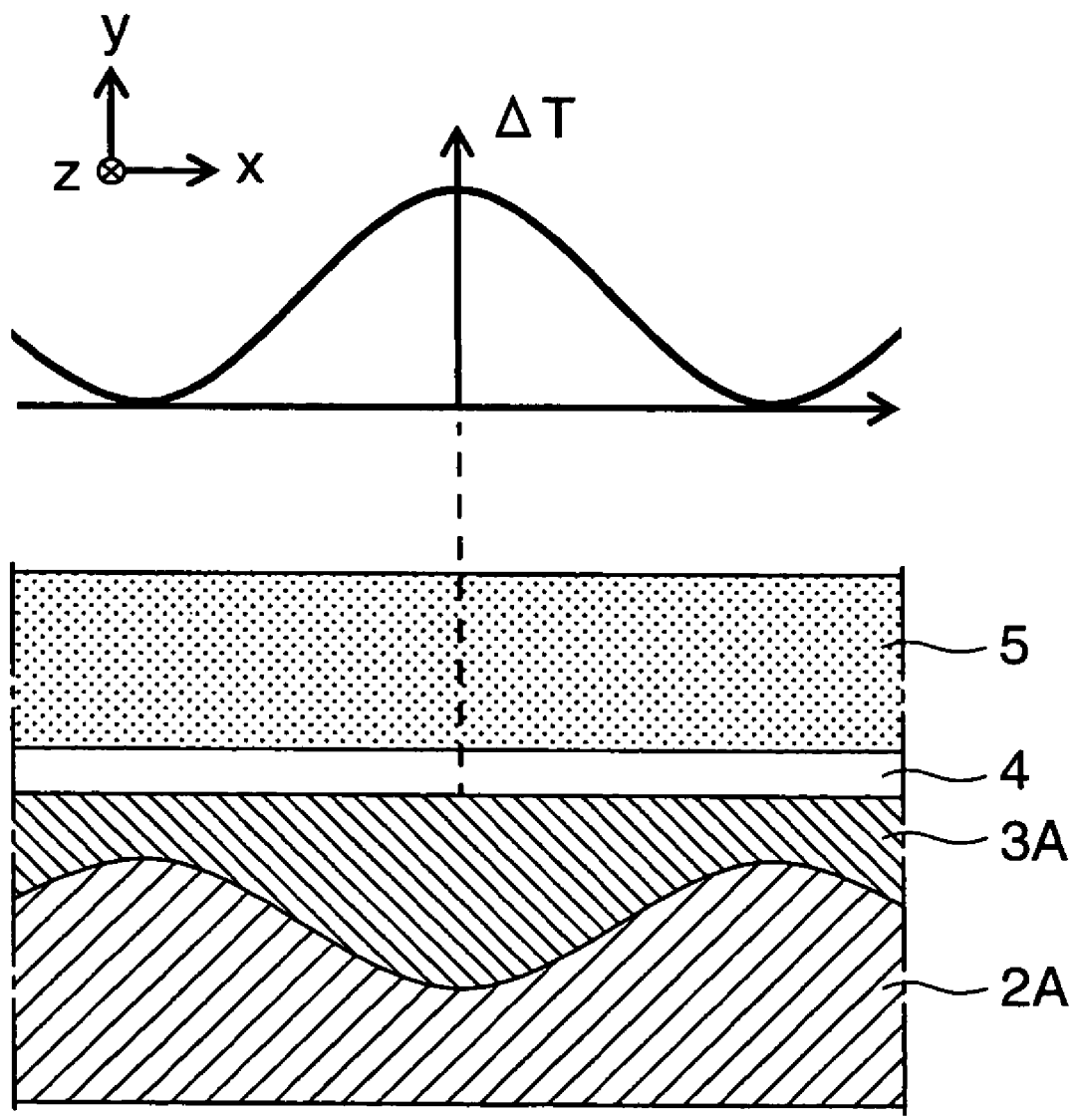
[FIG. 6] A diagram showing an example of a configuration of the heat sink which is different from those shown in FIGS. 2 and 3.

Also, the above-mentioned heat sink 2 has a comb configuration in a section perpendicular to the optical axis 6. However, any configuration may be applied when the temperature distribution can occur within the laser medium 5. FIG. 6 shows another example of the heat sink configuration, and shows a heat sink 2A, a bonding agent 3A, the clad 4, and the laser medium 5.

The clad 4 and the laser medium 5 have the same structures as those in the clad 4 and the laser medium 5 shown in FIG. 3, and have the same functions as those of the clad 4 and the laser medium 5 shown in FIG. 3 so far as there is no specific description.

The heat sink 2A is made of a material that is large in the thermal conductivity, and has a cyclic concavoconvex configuration in a section (x-y surface) perpendicular to the optical axis 6. The concavoconvex surface of the heat sink 2A is bonded onto the clad 4 through the bonding agent 3A.

The heat sink 2A and the bonding agent 3A usually have different thermal conductivities. In the case where the bonding agent 3A has the thermal conductivity that is smaller than that of the heat sink 2A, a portion where the thickness of the bonding agent 3A is thin, that is, convex portions of the heat sink 2A are high in the efficiency of the heat flow and low in the temperature, and a portion where the thickness of the bonding agent 3A is thick, that is, concave portions of the heat sink 2A are low in the efficiency of the heat flow and high in the temperature.

As a result, the thermal lens effect occurs with the concave portions of the heat sink 2A as the optical axis in the x-axial direction of the laser medium 5 and the same effects as those in the comb-shaped heat sink 2 is obtained. Also, with the above structure, because the entire surface of the clad 4 on the heat flow side is bonded onto the bonding agent 3A to exhaust the heat generated by the laser medium 5, the temperature rise of the laser medium 5 can be suppressed. Also, since the entire surface of the clad 4 on the heat flow side is bonded onto the bonding agent 3A, the high rigidity is obtained as compared with a case in which the clad 4 is fixed by only the leading ends of the comb configuration.

Figure 7:
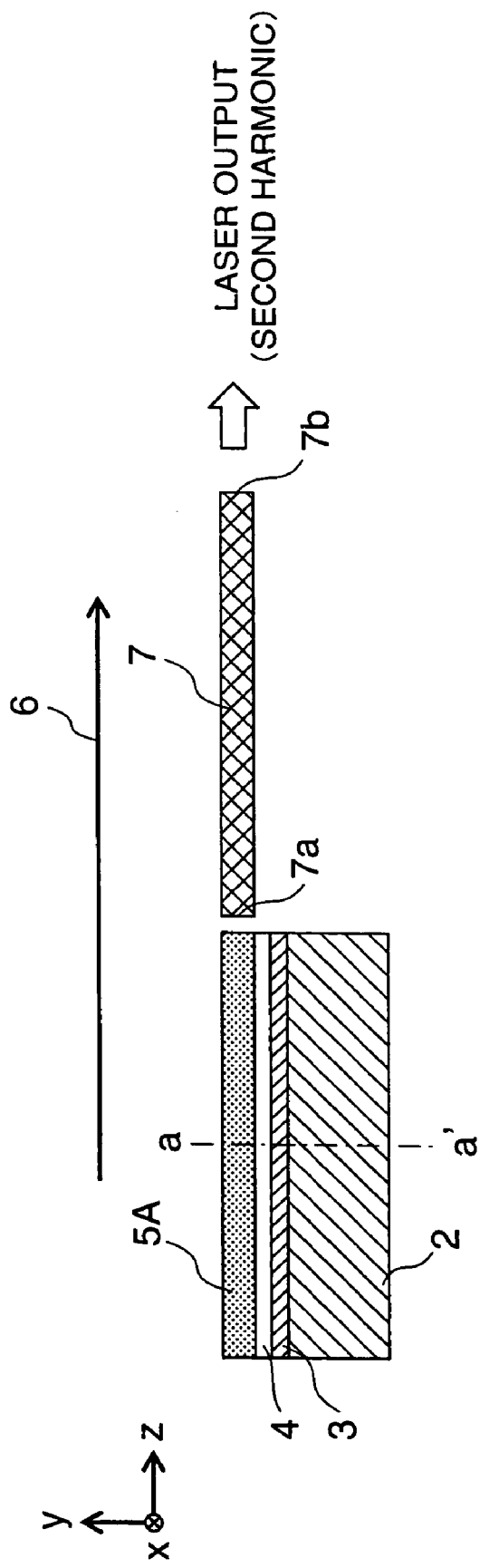
[FIG. 7] A side view showing a structure of a mode control waveguide laser device in the case of using a semiconductor laser 5A instead of the laser medium 5 shown in FIG. 1.

In the mode control waveguide laser device shown in FIG. 1, the solid-state laser medium 5 that is excited by the semiconductor laser 1 and generates the gain is used as the laser medium 5. Alternatively, as shown in FIG. 7, a semiconductor laser 5A may be used as the laser medium 5.

Although not shown, a voltage is applied to the upper and lower surfaces of the semiconductor laser 5A, and a current is allowed to flow in the upper and lower surfaces thereof, and thus the semiconductor laser 5A generates the gain in the laser beam of a desired wavelength. In this situation, a part of the current is converted into the heat, and the heat is generated within the semiconductor laser 5A.

Therefore, as shown in FIG. 2, the heat sink 2 is used to generate the cyclic thermal lens effect with the center portion of the two teeth of the comb in the x-axial direction as the optical axis.

With the above structure, since the number of parts can be reduced as compared with the mode control waveguide laser device shown in FIG. 1, the manufacturing costs can be reduced. Also, since the number of optical parts is reduced, there can be structured the mode control waveguide laser device that requires a small number of adjustments and high in the reliability.

Embodiment 2

In the normal laser resonator that does not conduct the wavelength selection, oscillation due to a plurality of longitudinal modes which are slightly different in the wavelength occurs within a range in which the laser medium has the gain, and the oscillation wavelength band becomes broad. In the wavelength conversion including SHG, in the case where the oscillation wavelength band of the fundamental laser beam is broad, there occurs the deterioration of the conversion efficiency due to the phase mismatching. Accordingly, in order to realize the high conversion efficiency, the fundamental laser beam having the narrow wavelength band is required, and the oscillation in the single longitudinal mode is desired.

In the above embodiment 1, as the method of selectively oscillating only the desired wavelength, the method of giving the loss to the clad 4 is described. However, in the case where the loss is given to the clad 4, the loss also occurs in the desired wavelength, and the efficiency of the fundamental laser beam is deteriorated.

In Embodiment 2, there is described a structure that eliminates the above drawback by using an element that selects the wavelength.

Figure 8:
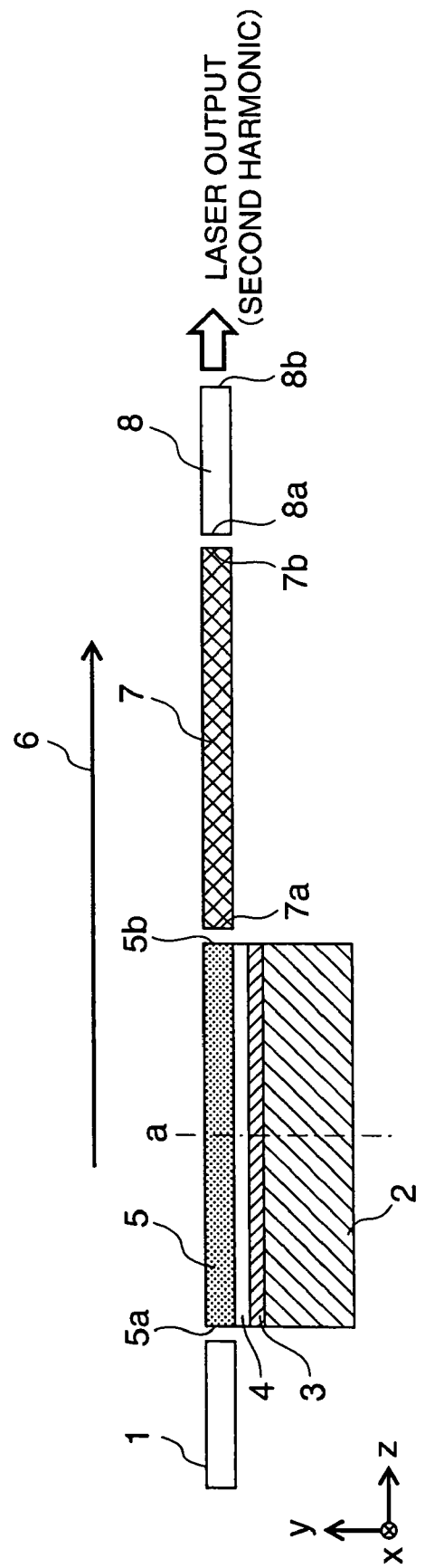
[FIG. 8] A side view showing a structure of a mode control waveguide laser device according to Embodiment 2 of the present invention.

FIG. 8 is a side view showing the structure of the mode control waveguide laser device according to Embodiment 2 of the present invention. Referring to FIG. 8, as a new reference numeral, reference numeral 8 denotes a wavelength select waveguide, and the semiconductor laser 1 to the nonlinear material 7 have the same structures as those of the semiconductor 1 to the nonlinear material 7 shown in FIG. 1, and have the same functions as those of the semiconductor 1 to the nonlinear material 7 shown in FIG. 1 so far as there is no specific description.

The wavelength select waveguide 8 has a cross-section perpendicular to the optical axis 6 which has substantially the same configuration as that of the laser medium 5 and the nonlinear material 7, and has end surfaces 8a and 8b that are perpendicular to the optical axis 6. The end surface 8a is disposed in the proximity of the end surface 7b of the nonlinear material 7.

The wavelength select waveguide 8 totally reflects the fundamental laser beam of a desired wavelength, and transmits the fundamental laser beam of other wavelengths and the second harmonic laser beam. The wavelength band that is reflected by the wavelength select waveguide 8 is set so that the phase mismatching that occurs in the wavelength conversion in the nonlinear material 7 becomes sufficiently small.

As a method of giving the wavelength selectivity to the reflection of the wavelength select waveguide 8, for example, there is a method of coating the end surface 8b of the wavelength select waveguide 8 with an optical coating that reflects the desired wavelength and transmitting other wavelengths, or there is structured a diffraction grating that gives the refractive index distribution to the wavelength select waveguide 8 in the direction of the optical axis 6 and reflects only the desired wavelength. The optical coating is formed of, for example, a dielectric multilayer coating. Also, as a method of giving the refractive index change to the mode control waveguide 8, it is possible to realize the method by, for example, irradiating the mode control waveguide 8 with the interference light of the laser beam that is high in the intensity to cyclically change the refractive index.

Also, the wavelength select waveguide 8 has upper and lower surfaces perpendicular to the y-axis which are interposed in the air or clad (not shown) which has the refractive index smaller than that of the wavelength select waveguide 8. The thickness of the wavelength select waveguide 8 is about several to several tens of times of the wavelength. As a result, the y-axial direction of the wavelength select waveguide 8 operates as the waveguide. The wavelength select waveguide 8 has substantially the same waveguide mode as the waveguide mode of the laser medium 5 and the nonlinear material 7.

The fundamental laser oscillation occurs between the end surface 5a of the laser medium 5 which is perpendicular to the optical axis 6 and the wavelength select waveguide 8. The end surface 5a is coated with a total reflection coating that reflects the fundamental laser beam, the end surface 5b is coated with an antireflection coating that transmits the fundamental laser beam, the end surface 7a is coated with an optical coating that transmits the fundamental laser beam and reflects the second harmonic laser beam, and the end surface 7b is coated with an antireflection coating that transmits the fundamental laser beam and the second harmonic laser beam. The total reflection coating, the antireflection coating, and the optical coating are structured, for example, by laminating dielectric thin coatings.

With the above structure, since the laser oscillation of the fundamental laser beam with the desired wavelength can be obtained without giving loss, it is possible to realize the high conversion efficiency to the second harmonics in the nonlinear material 7.

Also, in the laser device shown in FIG. 8, the wavelength select waveguide 8 has substantially the same waveguide mode as the waveguide mode of the laser medium 5 and the nonlinear material 7. Alternatively, the thickness of the wavelength select waveguide 8 in the y-axial direction, and the refractive index of the clad are so adjusted as to guide only the lower-order mode or the single mode.

With the above structure, because the laser oscillation in the y-axial direction is restricted by the lowest-order mode in the resonator, even in the case where a desired waveguide mode is not obtained in the y-axial direction of the laser medium 5 and the nonlinear material 7, the oscillation is conducted in the lower-order mode or the single mode of the wavelength select waveguide 8, thereby making it possible to realize the high-brightness oscillation.

Embodiment 3

Embodiment 3 shows a structure in which the second harmonic laser beam of the plurality of wavelengths is outputted from one laser device.

Figure 9:
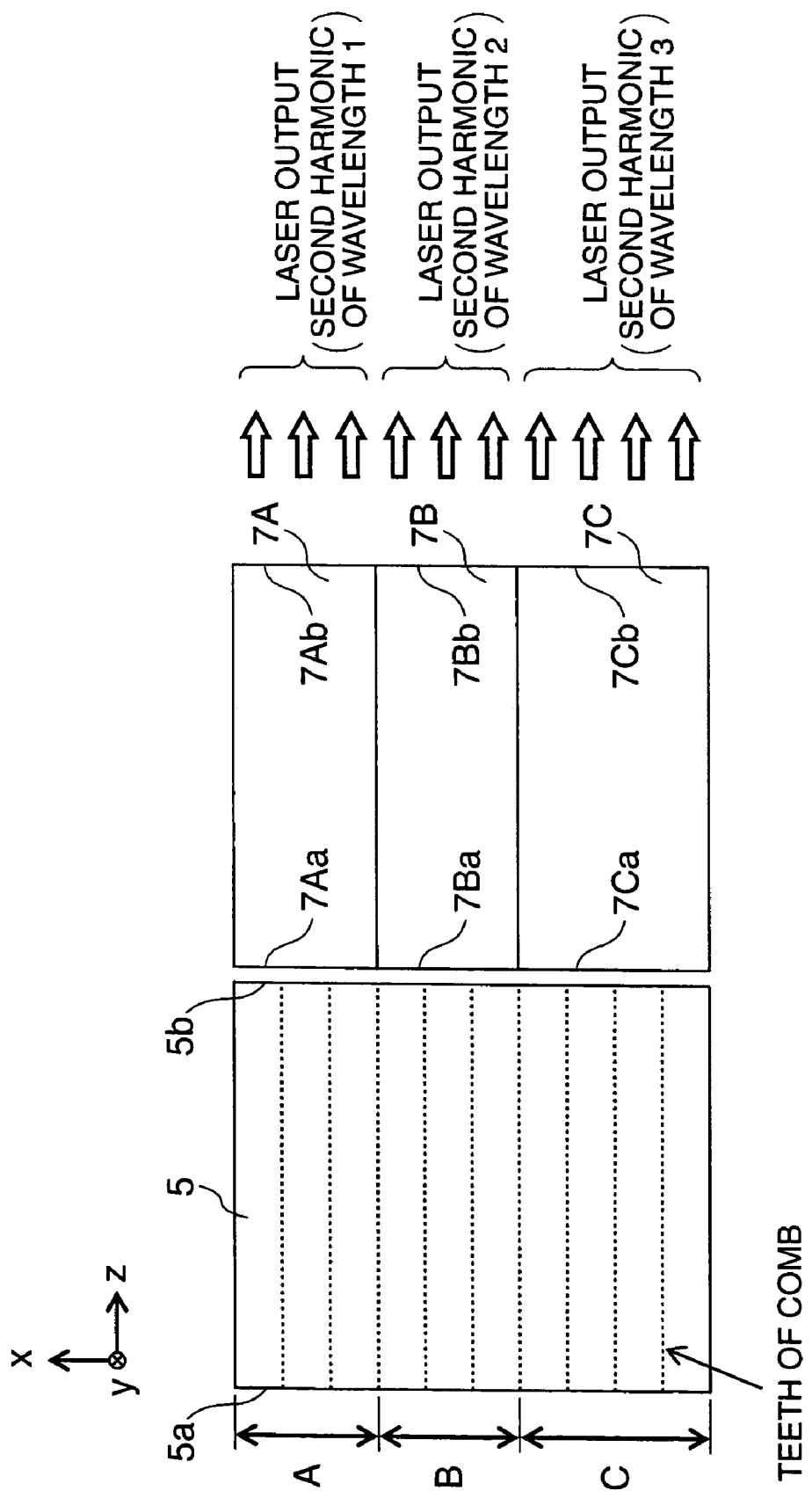
[FIG. 9] A diagram showing a laser medium and a nonlinear material of a mode control waveguide laser device according to Embodiment 3 of the present invention.

FIG. 9 is a diagram showing a laser medium and a nonlinear material of a mode control waveguide wavelength conversion laser device according to Embodiment 3 of the present invention. Referring to FIG. 9, the laser medium 5 and the nonlinear materials 7A to 7C have the same structures as those of the laser medium 5 and the nonlinear material 7 shown in FIG. 1, respectively, and have the same functions as the laser medium 5 and the nonlinear material 7 so far as there is no specific description.

The x-axial direction of the laser medium 5 is formed with a plurality of independent oscillation modes having the center of the two teeth of the comb of the heat sink 2 as the optical axis. Accordingly, there are arranged a plurality of nonlinear materials 7A to 7C in which the wavelength characteristics of the total reflection coating and the partial reflection coating which are coated on the end surfaces 5a and 5b of the laser medium 5 are changed in each of the oscillation modes, and the laser beam is converted into the second harmonic laser beam in each of the wavelengths. As a result, there can be obtained the high-brightness second harmonic laser beam output having the plurality of wavelengths from one laser device.

The laser medium 5 is made of a laser medium having the gain in the plurality of wavelengths, and made of, for example, Nd:YAG that has the gain in 946 nm (wavelength 1), 1064 nm (wavelength 2), and 1338 nm (wavelength 3). Regions A to C show ranges of the outputted second harmonic laser beam.

Referring to FIG. 9, the end surface 5a of the laser medium 5 in a region A is coated with an optical coating that totally reflects the wavelength 1 and transmits the wavelengths 2 and 3, the end surface 5b of the laser medium 5 in the region A is coated with an optical coating that transmits the wavelengths 1 to 3, the end surface 7Aa of the nonlinear material 7A is coated with an optical coating that transmits the wavelengths 1 to 3 and reflects the second harmonic laser beam of the wavelength 1, and the end surface 7Aa of the nonlinear material 7A is coated with an optical coating that totally reflects the wavelength 1 and transmits the wavelengths 2 and 3 and the second harmonic laser beam of the wavelength 1.

Likewise, the end surface 5a of the laser medium 5 in a region B is coated with an optical coating that totally reflects the wavelength 2 and transmits the wavelengths 1 and 3, the end surface 5b of the laser medium 5 in the region B is coated with an optical coating that transmits the wavelengths 1 to 3, and an end surface 7Ba of the nonlinear material 7B is coated with an optical coating that transmits the wavelengths 1 to 3 and reflects the second harmonic laser beam of the wavelength 2. The end surface 7Ba of the nonlinear material 7B is coated with an optical coating that totally reflects the wavelength 2, and transmits the wavelengths 1 and 3, and the second harmonic laser beam of the wavelength 2.

In the same manner, the end surface 5a of the laser medium 5 in a region C is coated with an optical coating that totally reflects the wavelength 3 and transmits the wavelengths 2 and 3, the end surface 5b of the laser medium 5 in the region C is coated with an optical coating that transmits the wavelengths 1 to 3, and an end surface 7Ca of the nonlinear material 7C is coated with an optical coating that transmits the wavelengths 1 to 3 and reflects the second harmonic laser beam of the wavelength 3. Also, the end surface 7Ca of the nonlinear material 7C is coated with an optical coating that totally reflects the wavelength 3, and transmits the wavelengths 1 and 2, and the second harmonic laser beam of the wavelength 3.

Therefore, the laser oscillation of the wavelength 1 is generated to output only the second harmonic laser beam of the wavelength 1 in the region A, the laser oscillation of the wavelength 2 is generated to output only the second harmonic laser beam of the wavelength 2 in the region B, and the laser oscillation of the wavelength 3 is generated to output only the second harmonic laser beam of the wavelength 3 in the region C.

With the above structure, since the second harmonic laser beams of the plurality of wavelengths can be outputted from one laser device at the same time, it is possible to structure the laser device that is small in size. The number of wavelengths is three in the above example, but it is apparent that the same effects are obtained when the number of wavelengths is two or more. Also, it is possible to output the wavelengths of the number of the oscillation modes that oscillate independently at the maximum at the same time.

Also, a plurality of inversion cyclic structures that are optimized to the respective wavelengths may be produced on one substrate by using the nonlinear material having the cyclic polarization inversion structure as the material of the nonlinear materials 7A to 7C. With the above structure, because the nonlinear materials 7A to 7C can be integrated together, the number of optical parts can be reduced, and the wavelength convention laser device that is inexpensive and small in size can be structured.

Embodiment 4

In the above embodiment 1, there is provided the mode control waveguide laser device in which the fundamental laser beam is oscillated in the independent a plurality of resonator modes, the wavelength conversion is conducted within the resonator by the nonlinear material, and the second harmonic laser beam is outputted with a high efficiency. On the other hand, as the wavelength conversion system, there is an external wavelength conversion system that outputs the fundamental laser beam to the external of the resonator, and inputs the outputted fundamental laser beam to the nonlinear material to convert the wavelength of the fundamental laser beam.

In this system, because the laser device that outputs the fundamental laser beam and the nonlinear material that conducts the wavelength conversion can be structured individually, there is an advantage in that the design becomes easy. On the other hand, the power density of the fundamental laser beam in the external of the resonator is smaller than that inside of the resonator even if the beam diameters are identical with each other. In order to realize the high-efficiency wavelength conversion, there is required a high-brightness fundamental laser beam output which can be focused to a small beam diameter.

Embodiment 4 realizes the mode control waveguide laser device that is suitable for the external wavelength conversion, oscillates in the independent plurality of modes, and outputs the high-brightness fundamental laser beam.

Figure 10:
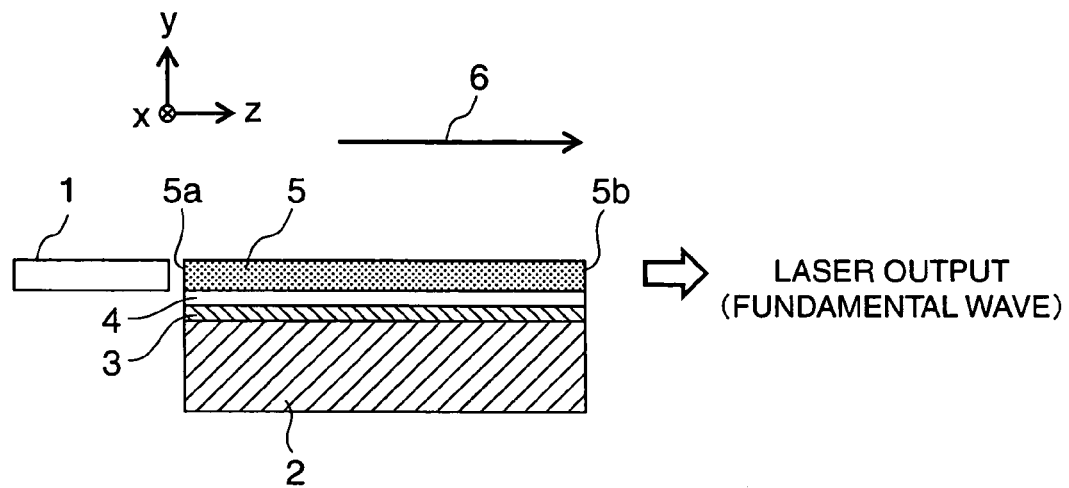
[FIG. 10] A diagram showing a structure of a mode control waveguide laser device according to Embodiment 4 of the present invention, viewed from a side of the laser device.
Figure 11:
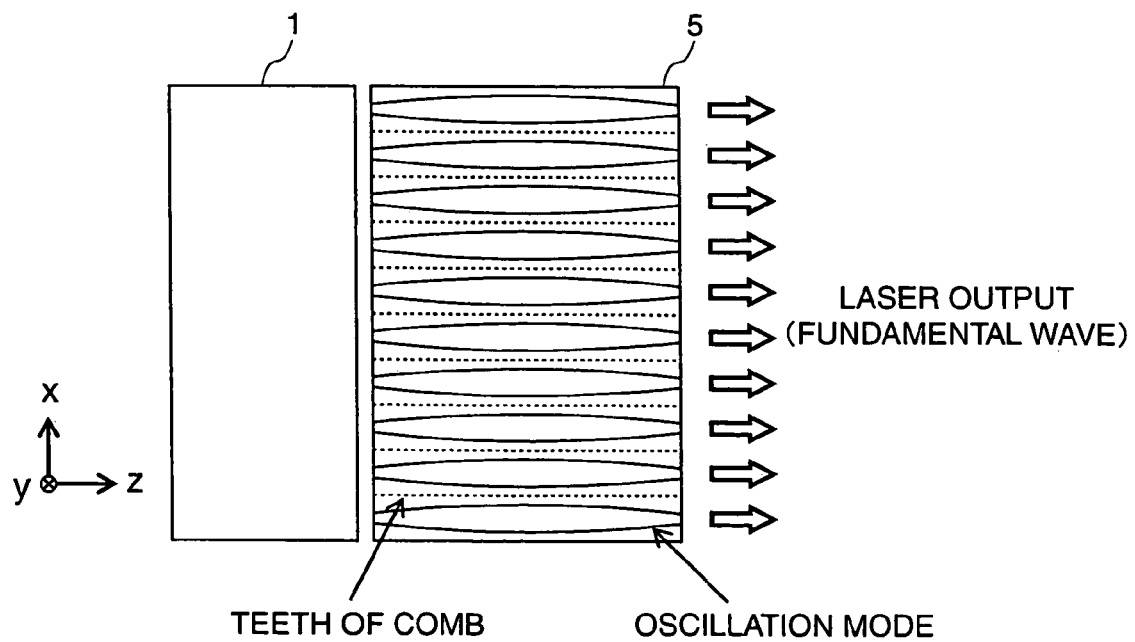
[FIG. 11] A diagram showing a structure of a mode control waveguide laser device according to Embodiment 4 of the present invention, viewed from a top of the laser device.

FIGS. 10 and 11 are diagrams showing the structure of the mode control waveguide laser device according to Embodiment 4 of the present invention. FIG. 10 is a side view of the laser device, and FIG. 11 is a top view of the laser device. The mode control waveguide laser device according to Embodiment 4 shown in FIGS. 10 and 11 is made up of the semiconductor laser 1, the heat sink (refractive index distribution addition means) 2, the bonding agent 3, the clad (low refractive index portion) 4, and the laser medium 5. Also, reference numeral 6 denotes an optical axis that is representative of a laser oscillation direction. The semiconductor laser 1 to the laser medium 5 are identical in structure with the semiconductor laser 1 to the laser medium 5 shown in FIG. 1, and have the same functions as those in the semiconductor laser 1 to the laser medium 5 shown in FIG. 1 so far as there is no specific description.

In this example, the end surface 5a of the laser medium 5 is coated with a total reflection coating that reflects the fundamental laser beam, and the end surface 5b is coated with an antireflection coating that partially reflects the fundamental laser beam and partially transmits the fundamental laser beam. The total reflection coating and the partial reflection coating are formed by, for example, laminating dielectric thin coatings. In the case where the excited light that is outputted from the semiconductor laser 1 is inputted from the end surface 5a of the laser medium 5, the total reflection coating of the end surface 5a becomes an optical coating that transmits the excited light and reflects the fundamental laser beam.

Now, the operation will be described with reference to FIG. 10.

The excited light that has been inputted from the end surface 5a of the laser medium 5 is absorbed by the laser medium 5, and generates the gain of the fundamental laser beam inside of the laser medium 5. The gain that has been generated inside of the laser medium 5 allows the fundamental laser beam to conduct laser oscillation between the end surfaces 5a and 5b that are perpendicular to the optical axis 6 of the laser medium 5, and a part of the oscillation light is outputted to the external of the resonator from the end surface 5b.

The laser oscillation within the laser resonator in the y-axial direction selectively oscillates in the mode of the waveguide of the laser medium 5. The waveguide mode of the laser medium 5 can be arbitrarily set according to the thickness and the refractive index difference with respect to the clad, and guides the waves only in the lower-order mode or the single mode, thereby realizing the high-brightness oscillation.

The laser oscillation within the laser resonator in the x-axial direction does not select the mode of the waveguide and produces a spatial resonator because the width of the laser medium 5 is sufficiently large as compared with the wavelength of the fundamental laser beams. In the laser medium 5, since the thermal lens effect with the center of the two teeth of the comb as the optical axis is cyclically generated by means of the comb structure of the heat sink 2, the mode of the laser oscillation is given by the thermal lens that is generated in the laser medium 5 to generate the oscillation modes independent in the respective optical axes. The intensity and the cycle of the thermal lens of the laser medium 5 are adjusted so that the independent respective oscillation modes becomes only the lower-order mode or the single mode, thereby making it possible to realize the high-brightness oscillation.

It is not always necessary that teeth in the comb structure of the heat sink 2 are provided at regular intervals, and for example, in a case where the distribution exists in the output of the semiconductor laser 1 in the x-axial direction, the intervals of the teeth of the comb are changed according to the calorific power, thereby making it possible to realize the high-brightness oscillation in all of the independent oscillation modes of the laser medium 5.

With the above structure, because the laser medium 5 is the spatial resonator in the x-axial direction, it is possible to freely set the width of the laser medium 5 in the x-axial direction. Also, since the semiconductor laser 1 is not required of high beam quality in the x-axial direction, the width of the laser medium 5 is adjusted according to the width of the semiconductor laser 1 in the x-axial direction, thereby making it possible to freely set the width of the semiconductor laser 1 in the x-axial direction. Accordingly, a broad area LD having a wide light-emitting area which is capable of producing high power output or an LD array in which the emitters are arranged in a line can be used to attain a high power output of the excited light, thereby making it possible to output the fundamental laser beam that is high in the luminance and high in the output which is suitable for the wavelength conversion.

Also, since the thickness of the laser medium 5 is thin in the y-axial direction and the power density of the excited light becomes high, the high gain can be obtained by using a laser medium that is small in gain or a three-level laser medium that is large in lower-level absorption, thereby making it possible to output the high-brightness fundamental laser beam that is suitable for the wavelength conversion with high efficiency.

Also, since the thickness of the laser medium 5 is thin in the y-axial direction the temperature rise of the laser medium 5 becomes small, and the high-brightness fundamental laser beam that is suitable for the wavelength conversion can be outputted with high efficiency by using the three-level laser medium where the gain is deteriorated due to the temperature rise.

Also, since the semiconductor laser 1 can be disposed in the proximity of the laser medium 5, the focusing optical system for the excited light, and the optical system that constitutes the resonator are not required, thereby making it possible to structure the laser device that is small in size and inexpensive.

Also, since the alignment adjustment of the resonator is not required, it is possible to structure the laser device that is high in reliability.

Also, in the waveguide laser device shown in FIG. 10, there are many cases in which the laser oscillation obtains the linear polarization due to the gain/loss ratio of the waveguide mode. Therefore, even in the case where the linear polarization is required in the fundamental laser beam in the wavelength conversion, it is possible to output the high-brightness fundamental laser beam that is suitable for the wavelength conversion. In addition, the linear polarization in the higher direction of the gain can be easily obtained by using the laser medium (a laser medium whose host consists of crystals having a double refraction such as YLF, $YVO_4$, $GdVO_4$, KGW, KYW, Sapphire, or the like) that is different in the gain according to the crystal axial direction as the laser medium 5. As a result, even in the case where the linear polarization is required for the fundamental laser beam in the wavelength conversion, it is possible to output the high-brightness fundamental laser beam that is suitable for the wavelength conversion.

Also, in the laser device shown in FIG. 1, the oscillation due to the plurality of longitudinal modes that are slightly different in the wavelength occurs within a range in which the laser medium 5 has the gain. In the wavelength conversion including SHG, in the case where the oscillation wavelength band of the fundamental laser beam is broad, the conversion efficiency is deteriorated due to the phase mismatching. Therefore, in order to realize the high conversion efficiency, the fundamental laser beam having a narrow wavelength band is required, and oscillation of the single longitudinal mode is desirable.

In the standing-wave type laser oscillator, because the standing waves are produced within the resonator, there exist nodes at which the field intensity becomes zero, and antinodes at which the field intensity becomes maximum. When the wavelengths are different from each other, the positions of the nodes and the antinodes of the standing waves of the respective wavelengths are displaced. As a result, when losses are cyclically given to the direction of the optical axis 6, the losses and the electric field are superimposed on each other, thereby making it possible to give different losses to the respective wavelengths, and also making it possible to selectively oscillate only the desired wavelength.

Also, in the mode control waveguide laser device shown in FIG. 10, the y-axial direction oscillates in the mode of the waveguide which is confined inside of the laser medium 5, but the electric field due to seeping slightly exists within the clad 4. Therefore, the cyclic loss is given to the clad 4, thereby making it possible to selectively oscillate only the desired wavelength.

Also, when the refractive index of the clad 4 cyclically changes, the trapping intensity of the laser beam within the laser medium 5 changes, with the result that the same effect as that in the case where the loss is cyclically given is obtained.

As a method of giving the loss to the clad 4, there is, for example, a method of adding ions that absorb the laser beam to the clad 4, and Cr4+ ion may be cyclically added to the laser beam of 1 μm. As a method of giving the refractive index change to the clad 4, the method can be realized by, for example, irradiating the clad 4 with an interference light of the laser beam that is high in intensity, and cyclically changing the refractive index. With the above structure, since only the desired wavelength can be selectively oscillated, it is possible to obtain the oscillation of the fundamental laser beam that is suitable for the wavelength conversion.

In addition, in the case where the laser medium 5 is made of a laser medium having the gain in the plurality of wavelengths, because the thickness of the laser medium 5 in the y-axial direction is thin, very large gains are generated in the respective wavelengths. For that reason, when the wavelengths other than the desired wavelength are reflected by the end surface 5b of the laser medium 5, there is a case in which the laser oscillation (parasitic oscillation) of unnecessary wavelengths occurs between the end surface 5a and the reflection surface.

In the mode control waveguide laser device shown in FIG. 10, the y-axial direction oscillates in the mode of the waveguide which is confined inside of the laser medium 5, but the electric field due to seeping slightly exists within the clad 4. Therefore, when the clad 4 is made of a material that transmits the desired wavelength and absorbs the unnecessary wavelengths, it is possible to increase the loss of the unnecessary wavelengths and suppress the parasitic oscillation. In order to absorb the unnecessary wavelengths by the clad 4, for example, ions that do not absorb the desired wavelength but absorb the unnecessary wavelengths may be added to glass or crystal.

Also, the semiconductor laser 1 is disposed in the proximity of the end surface 5a of the laser medium 5. Alternatively, the semiconductor laser 1 may be disposed in the proximity of a side surface parallel to the z-y surface. With the above arrangement, because the leakage light of the fundamental laser light is not directly inputted to the semiconductor laser 1, the possibility of damaging the semiconductor laser 1 is reduced and the laser device that is high in reliability can be structured.

The surface opposite to the surface of the laser medium 5 which is bonded to the clad 4 is in contact with the air. Alternatively, the surface may be bonded to a second clad having a refractive index that is smaller than that of the laser medium 5. With the above structure, the refractive index difference between the laser medium 5 and the second clad is adjusted, thereby making it possible to arbitrarily adjust the propagation mode of the laser medium 5 in the y-axial direction. Also, when the thickness of the second clad in the y-axial direction is thickened, it is possible to increase the rigidity of the laser medium 5 without any influence on the waveguide mode of the laser medium 5.

Also, the surface opposite to the surface of the laser medium which is bonded onto the clad 4 is in contact with the air. Alternatively, the surface may be bonded onto the substrate through a second bonding agent having a refractive index that is smaller than that of the laser medium 5. The second bonding agent is made of, for example, an optical adhesive. Also, the substrate is made of, for example, an optical material or metal.

With the above structure, the refractive index difference between the laser medium 5 and the bonding agent is adjusted, thereby making it possible to arbitrarily adjust the propagation mode of the laser medium 5 in the y-axial direction. Also, when the thickness of the substrate in the y-axial direction is thickened, it is possible to enhance the rigidity of the laser medium 5 without any influence on the waveguide mode of the laser medium 5. In addition, in the case where thermal expansion occurs due to the temperature rise of the laser medium 5, since the optical adhesive is lower in rigidity than crystal or glass material, the optical adhesive is deformed according to the expansion of the laser medium 5, thereby making it possible to alleviate a stress that is exerted on the laser medium 5.

Further, the surface opposite to the surface of the laser medium which is bonded onto the clad 4 is in contact with the air. Alternatively, it is possible that the surface is coated with an optical coating having a refractive index that is smaller than that of the laser medium 5, and the surface of the optical coating is bonded onto a substrate having substantially the same thermal expansion coefficient as that of the laser medium 5 through optical contact or diffusion bonding.

With the above structure, the refractive index difference between the laser medium 5 and the optical coating is adjusted, thereby making it possible to arbitrarily adjust the propagation mode of the laser medium 5 in the y-axial direction. Also, when the thickness of the substrate in the y-axial direction is thickened, it is possible to enhance the rigidity of the laser medium 5 without any influence on the waveguide mode of the laser medium 5. Further, in the case where the thermal expansion occurs due to the temperature rise of the laser medium 5, since the laser medium 5 and the substrate are substantially identical with each other in the thermal expansion ratio, the substrate is also expanded at substantially the same rate. In this situation, since the optical coating is lower in density and in rigidity than crystal or glass material, the optical coating is deformed according to the expansion of the substrate, thereby making it possible to alleviate the stress that is exerted on the laser medium 5. In addition, when the optical coating and the substrate are bonded onto each other, the optical coating material and the substrate which are easily optically bonded onto each other are selected, thereby making it possible to enhance the bonding intensity.

In addition, it is also possible that the laser medium 5 and the clad 4 as well as the second clad are made of the same host material. In general, in the case where active ions are added to the host material to manufacture the laser medium, the host material and the laser medium slightly change their refractive indexes. For that reason, a host material, whose refractive index becomes high when added with the active ions, is used, the active ions are added to only the region of the laser medium 5, and the active ions are not added to the clad 4 and the second clad. As a result, the same effects are obtained.

With the above structure, in the case where the laser medium 5 and the clad 4 as well as the laser medium 5 and the second clad are optically bonded onto each other through the optical contact or the diffusion bonding, the high bonding intensity is obtained because the materials of the same type are bonded together. Also, it is possible to manufacture the laser medium 5 to which the active ions are added, the clad 4 to which the active ions are not added, and the second clad integrally through a ceramic manufacturing method in which crystal is crushed into particles and compression-molded before being sintered. In addition, in the case where the ceramic manufacturing method is adopted, because the active ions can be added with a high density as compared with crystal, it is possible to increase the absorption efficiency and the gain of the laser medium 5.

Embodiment 5

In the normal laser resonator in which the wavelength selection is not conducted, the oscillation due to a plurality of longitudinal modes that are slightly different in the wavelength from one another occurs within a range in which the laser medium has the gain, which broadens the oscillation wavelength band. In the wavelength conversion including SHG, in the case where the oscillation wavelength band of the fundamental laser beam is broad, the conversion efficiency is deteriorated due to the phase mismatching. Therefore, in order to realize high conversion efficiency, the fundamental laser beam having a narrow wavelength band is required, and oscillation of the single longitudinal mode is desirable.

In Embodiment 4, a method of giving a loss to the clad 4 is described as a method of selectively oscillating only the desired wavelength. However, in a case where the loss is given to the clad 4, the loss is also generated in the desired wavelength, which deteriorates the efficiency of the fundamental laser beam.

In Embodiment 5, a structure in which the element for selecting the wavelength is used to eliminate the above drawback is described.

Figure 12:
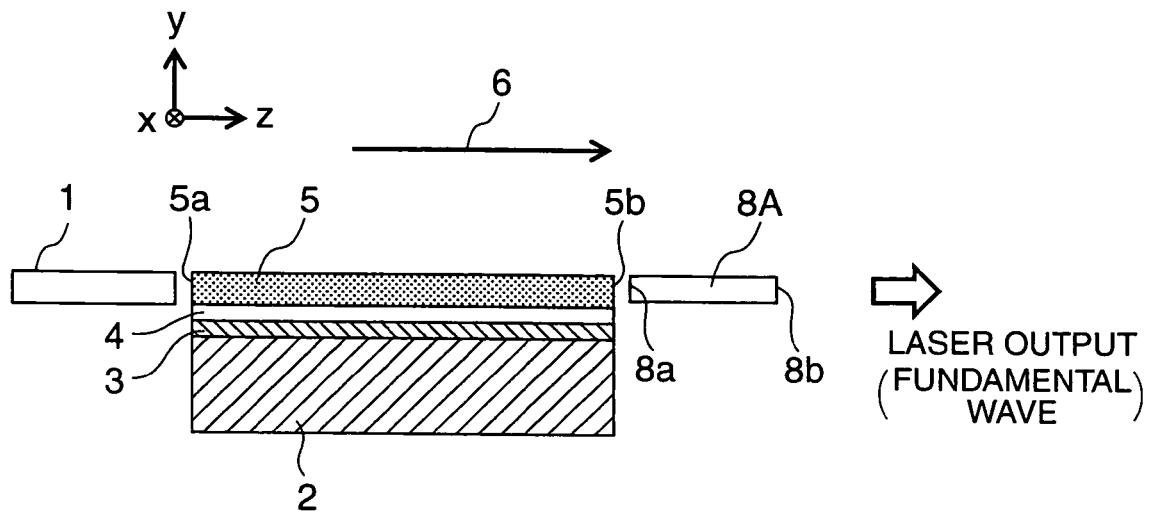
[FIG. 12] A side view showing a structure of a mode control waveguide laser device according to Embodiment 5 of the present invention.

FIG. 12 is a side view showing a structure of a mode control waveguide laser device according to Embodiment 5 of the present invention. The semiconductor laser 1 to the laser medium 5 are identical in structure with the semiconductor laser 1 to the laser medium 5 shown in FIG. 10, and have substantially the same functions as those of the semiconductor laser 1 to the laser medium 5 shown in FIG. 10 so far as there is no specific description. Also, the wavelength select element 8A is identical in structure with the wavelength select element 8 shown in FIG. 8, and has substantially the same function as that of the wavelength select element 8 shown in FIG. 8 so far as there is no specific description.

The wavelength select waveguide 8A has substantially the same configuration as that of the laser medium 5 in cross-section perpendicular to the optical axis 6, and has end surfaces 8a and 8b perpendicular to the optical axis 6. The end surface 8a is disposed in the proximity of the end surface 5b of the laser medium 5.

The wavelength select waveguide 8A partially reflects the fundamental laser beam of a desired wavelength, and transmits the fundamental laser beam of other wavelengths. The wavelength band that is reflected by the wavelength select waveguide 8A is set so as to sufficiently reduce the phase mismatching that occurs in the wavelength conversion in the nonlinear material disposed outside of the resonator.

As a method of giving the wavelength selectivity to the reflection of the wavelength select waveguide 8A, there is a method of coating the end surface 8b of the wavelength select waveguide 8A with an optical coating that reflects the desired wavelength and transmits other wavelengths, or a method of structuring a diffraction grating that gives the refractive index distribution to the wavelength select waveguide 8A in the direction of the optical axis 6 and reflects only the desired wavelength. The optical coating is formed of, for example, a dielectric multilayer coating. Also, as a method of giving the refractive index change to the mode control waveguide 8A, it is possible to realize the method by, for example, irradiating glass or crystal with interference light of a laser beam that is high in intensity to cyclically change the refractive index.

Also, the wavelength select waveguide 8A is interposed, at its upper and lower surfaces perpendicular to the y-axis, by the air or clad (not shown) having the refractive index smaller than that of the wavelength select waveguide 8A. The thickness of the wavelength select waveguide 8A is about several to several tens of times of the wavelength. As a result, the y-axial direction of the wavelength select waveguide 8A operates as the waveguide. The wavelength select waveguide 8A has substantially the same waveguide mode as the waveguide mode of the laser medium 5.

The fundamental laser oscillation occurs between the end surface 5a and the wavelength select waveguide 8 which are perpendicular to the optical axis 6 of the laser medium 5. The end surface 5a is coated with a total reflection coating for reflecting a fundamental laser beam, and the end surface 5b is coated with an antireflection coating for transmitting a fundamental laser beam. The total reflection coating and the antireflection coating are structured, for example, by laminating dielectric thin coatings.

With the above structure, since the laser oscillation of the fundamental laser beam with the desired wavelength can be obtained without giving any loss, it is possible to output the fundamental laser beam that is high in luminance and high in output which is suitable for the wavelength conversion.

Also, in the laser device shown in FIG. 12, the wavelength select waveguide 8A has substantially the same waveguide mode as the waveguide mode of the laser medium 5. Alternatively, the thickness of the wavelength select waveguide 8 in the y-axial direction, and the refractive index of the clad may be so adjusted as to guide only the lower-order mode or a single mode.

With the above structure, because the laser oscillation in the y-axial direction is restricted by the lowest-order mode in the resonator, even in a case where a desired waveguide mode is not obtained in the y-axial direction of the laser medium 5, the oscillation is conducted in a lower-order mode or a single mode of the wavelength select waveguide 8A, thereby making it possible to realize high-brightness oscillation.

Embodiment 6

Embodiment 6 discloses a structure in which fundamental laser beams of a plurality of wavelengths are outputted from one laser device.

Figure 13:
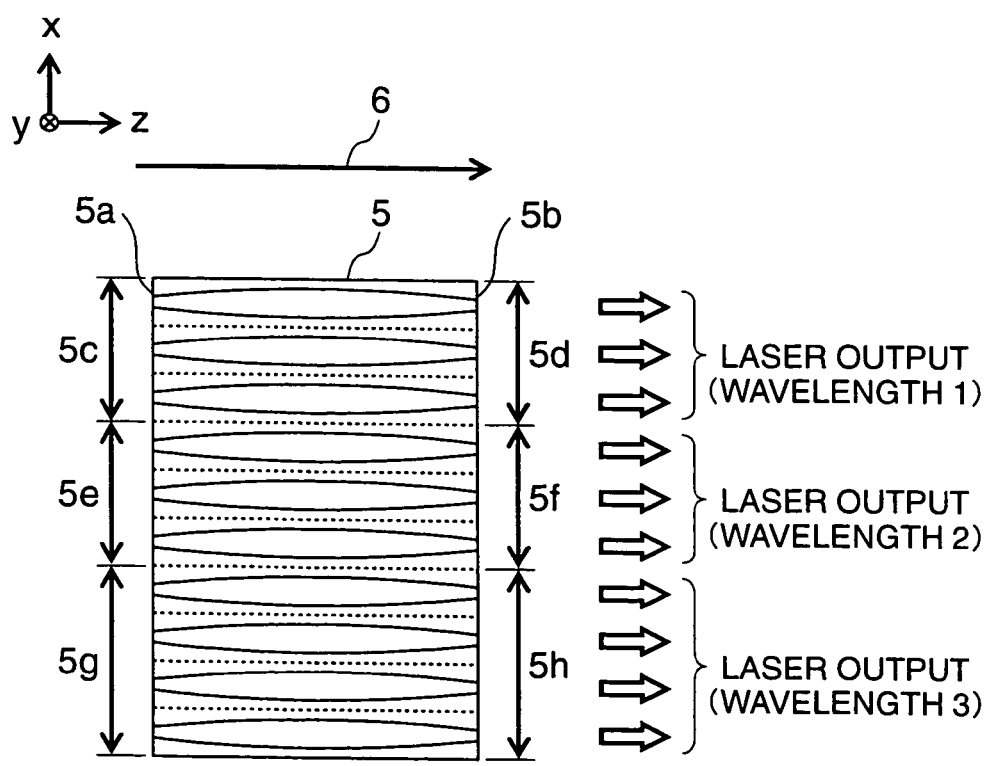
[FIG. 13] A side view showing a laser medium of a mode control waveguide laser device according to Embodiment 6 of the present invention, which shows only a laser medium 5 shown in FIG. 12.

FIG. 13 is a diagram showing a laser medium of a mode control waveguide laser device according to Embodiment 6 of the present invention, and the diagram shows only the laser medium 5 in FIG. 12. Referring to FIG. 13, the laser medium 5 has the same structure as that of the laser medium 5 shown in FIG. 12, and has the same function as that of the laser medium 5 shown in FIG. 12 so far as there is no specific description.

The x-axial direction of the laser medium 5 is formed with the plurality of independent oscillation modes with the optical axes thereof each serving as the center of two teeth of the comb of the heat sink 2. Therefore, the wavelength characteristics of all the reflection coatings and the partial reflection coatings that are coated on the end surfaces 5a and 5b of the laser medium 5 are changed depending on each of the oscillation modes, thereby making it possible to obtain the high-brightness laser oscillation light having the plurality of wavelengths from one laser medium 5.

The laser medium 5 is made of a laser medium having the gain in the plurality of wavelengths, and made of, for example, Nd:YAG that has a gain in 946 nm (wavelength 1), 1064 nm (wavelength 2), and 1338 nm (wavelength 3). The reflective coatings 5a to 5f represent the total reflection coatings and the partial reflection coatings with which the end surfaces 5a and 5b of the laser medium 5 are coated.

Referring to FIG. 13, the reflection coating 5c totally reflects the wavelength 1 and transmits the wavelengths 2 and 3, and the reflection coating 5d partially transmits the wavelength 1 and transmits the wavelengths 2 and 3. Also, the reflection coating 5e totally reflects the wavelength 2, and transmits the wavelengths 1 and 3, and the reflection coating 5f partially reflects the wavelength 2, and transmits the wavelengths 1 and 3. Furthermore, the reflection coating 5g totally reflects the wavelength 3 and transmits the wavelengths 2 and 3, and the reflection coating 5h partially reflects the wavelength 3, and transmits the wavelengths 1 and 2.

Therefore, only the laser oscillation of the wavelength 1 occurs within the laser medium 5 that is interposed between the reflection coating 5c and the reflection 5d, only the laser oscillation of the wavelength 2 occurs within the laser medium 5 that is interposed between the reflection coating 5e and the reflection 5f, and only the laser oscillation of the wavelength 3 occurs within the laser medium 5 that is interposed between the reflection coating 5g and the reflection 5h.

With the above structure, since the laser beams of the plurality of wavelengths can be outputted from one laser device at the same time, it is possible to structure the laser device that is small in size.

The number of wavelengths is three in the above example, but it is apparent that the same effects can be obtained when the number of wavelengths is two or more. Also, it is possible to cause the laser device to output the wavelengths of the number of the oscillation modes that oscillate independently at maximum at the same time.

Embodiment 7

In the above embodiments 1 to 6, there is shown the mode control waveguide laser device in which the lens effect within the laser medium 5 is cyclically generated by using the heat sink 2 having a comb structure. According to Embodiment 7, realized is a mode control waveguide laser device in which the refractive index distribution is generated by cyclically applying a stress to the laser medium 5, to thereby generate the cyclic lens effect within the laser medium 5.

Figure 14:
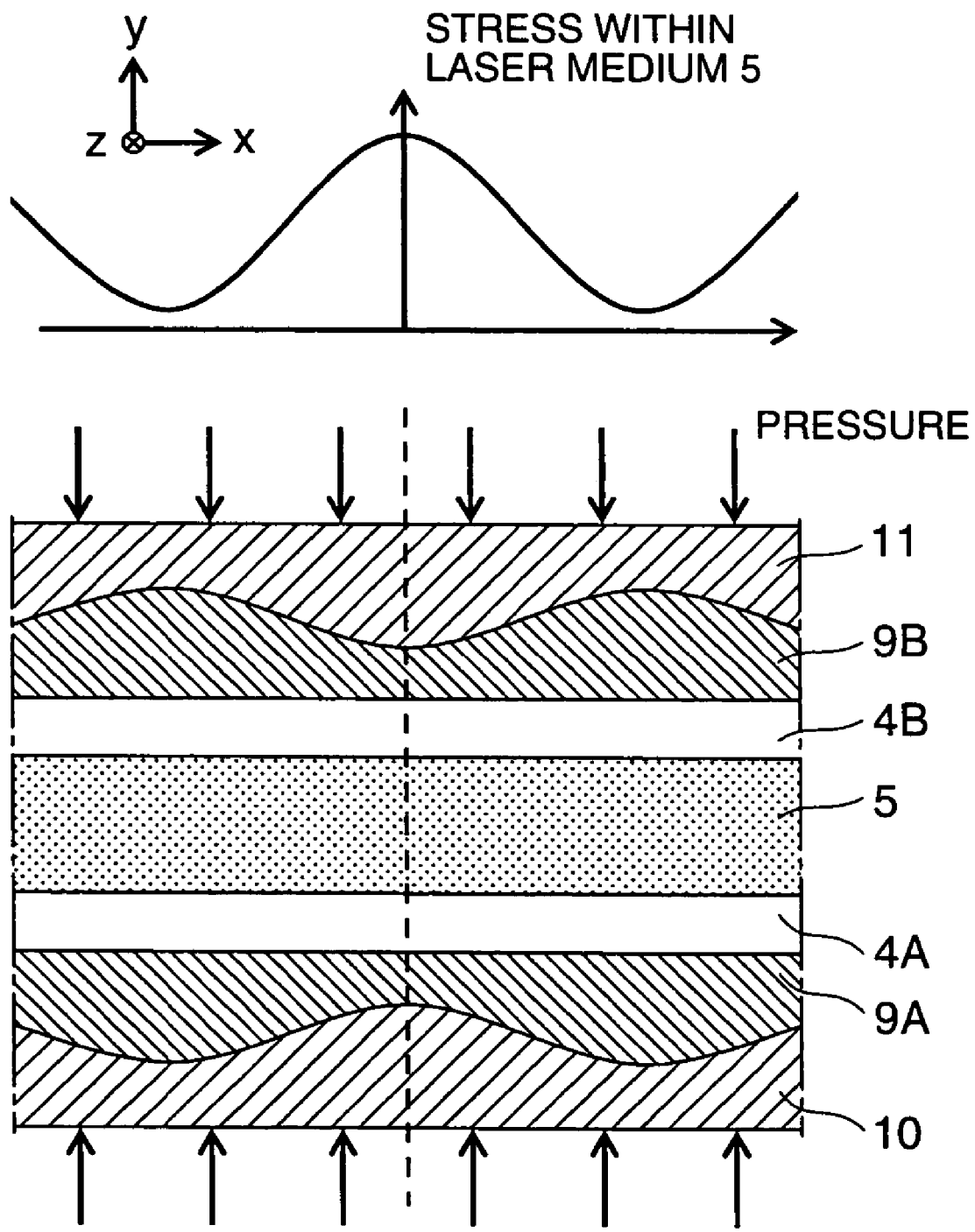
[FIG. 14] A diagram showing a structure that gives a refractive index distribution to a laser medium used for a mode control waveguide laser device according to Embodiment 7 of the present invention, viewing the laser device from a laser output surface side.
Figure 15:
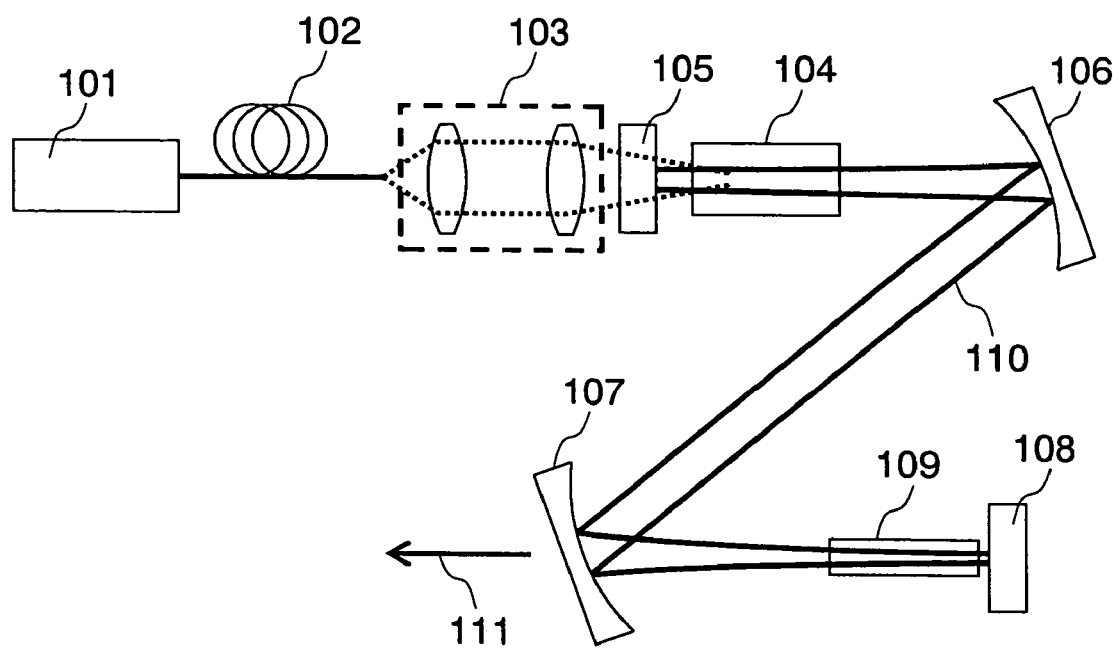
[FIG. 15] A diagram showing a structure of a conventional laser device disclosed in "Optics Communications 205 (2002), page 361, issued by Elsevier Corporation.

FIG. 14 is a diagram showing a structure in which a refractive index distribution is given to a laser medium, the structure being used in the mode control waveguide laser device according to Embodiment 7 of the present invention. The diagram shows a laser device viewed from a laser output surface side. The mode control waveguide laser oscillator according to Embodiment 7 is made up of a laser medium 5, a clad 4A, a clad 4B, a bonding agent 9A, a bonding agent 9B, a heat sink 10, and a substrate 11.

The clad 4A and the clad 4B have the same structure as that of the clad 4 shown in FIG. 3, and have the same function as that of the clad 4 shown in FIG. 3 so far as there is no specific description. Also, the laser medium 5 has the same structure as that of the laser medium 5 shown in FIG. 3, and has the same function as that of the laser medium 5 shown in FIG. 3 so far as there is no specific description.

The heat sink 10 has a cyclic concavoconvex configuration in cross-section (x-y surface) perpendicular to the optical axis 6, and the concavoconvex surface of the heat sink 10 is bonded to the clad 4A through the bonding agent 9A. Also, the heat sink 10 is made of a material that is large in thermal conductivity, and heat that has been generated in the laser medium 5 is exhausted to the heat sink 10 through the bonding agent 9A.

The substrate 11 has a cyclic concavoconvex configuration in cross-section (x-y surface) perpendicular to the optical axis 6, and the concavoconvex surface of the substrate 11 is bonded to the clad 4B through the bonding agent 9B. Also, the convex portion of the heat sink 10 and the convex portion of the substrate 11 are arranged in positions that are the same in the x-axial direction.

The bonding agent 9A and the bonding agent 9B are made of a material that is low in rigidity and soft as compared with that of the heat sink 10 and the substrate 11. For example, the bonding agent 9A and the bonding agent 9B can be realized by using a metal solder, an optical adhesive, a thermal conductive adhesive, or the like.

A pressure is exerted on the heat sink 10 and the substrate 11 from the external so that a stress is applied to the laser medium 5 in the y-axial direction.

Subsequently, a description will be given of a stress distribution to be generated in the laser medium 5 with reference to FIG. 14. When a pressure is applied to the heat sink 10 and the substrate 11 from the external, a stress is exerted on the laser medium 5 through the bonding agents 9A and 9B that are soft as compared with the heat sink 10 and the substrate 11. In this situation, since the thicknesses of the bonding agent 9A and the bonding agent 9B are large in the concave portions of the heat sink 10 and the substrate 11, the pressure is eased up due to the compression of the bonding agent 9A and the bonding agent 9B, and the stress applied to the laser medium 5 is reduced. On the other hand, since the thicknesses of the bonding agent 9A and the bonding agent 9B are small in the convex portions of the heat sink 10 and the substrate 11, the amount of compression of the bonding agent 9A and the bonding agent 9B is small, and a large stress is applied to the laser medium 5.

The refractive index of the optical material, such as the laser medium, changes due to a stress given thereto. Therefore, in a case of using a material whose refractive index increases due to a compression stress given thereto, the refractive index of the laser medium 5 increased at the positions of the convex portions of the heat sink 10 and the substrate 11, and the refractive index is reduced toward the concave portions. As a result, the cyclic lens effect is generated in the x-axial direction, with the convex portions serving as the optical axis.

With the above structure, it is possible to obtain the same effects as those in the comb-shaped heat sink shown in Embodiment 1.

Also, because the cyclic lens effect can be given due to a stress, it is possible to structure the laser device that can stably operate without depending on the intensity or distribution of the excited light.

Further, because the entire surface of the clad 4A on the heat flow side is bonded onto the bonding agent 9A, through which the heat generated in the laser medium 5 is exhausted, it is possible to suppress a temperature rise of the laser medium 5. Also, since the entire surface of the clad 4A on the heat flow side is bonded onto the bonding agent 9A, high rigidity is obtained as compared with the case in which the clad 4A is fixed only by the leading ends of a comb configuration.

Here, the laser medium 5 is interposed between the clad 4A and the clad 4B. Alternatively, when the bonding agent 9A and the bonding agent 9B are made of a material having a refractive index that is smaller than that of the laser medium 5, the provision of the clad 4A and the clad 4B may not be required, and the bonding agent 9A and the bonding agent 9B may be bonded directly to the laser medium 5.

INDUSTRIAL APPLICABILITY

According to the present invention, the plurality of oscillation modes are oscillated within the laser medium, which facilitates output scaling, and attains a high-brightness fundamental wave output, with the result that the high-efficiency second harmonic conversion is enabled. The present invention can be used for the high-output power laser device and the wavelength conversion laser device which are suitable for a light source used for devices such as a printer and a projection television.

The invention claimed is:

1. A mode control waveguide laser device comprising:
   a laser medium that is planar, has a waveguide structure in a thickness direction of a cross-section perpendicular to an optical axis, and has a cyclic lens effect in a direction perpendicular to the optical axis and the thickness direction;
   a clad that is bonded onto one surface of the laser medium; and
   a heat sink that is bonded onto one surface side of the laser medium through the clad,
   and wherein a laser oscillation comprises a laser oscillation that oscillates in a waveguide mode of the laser medium, and a laser oscillation that oscillates in a plurality of independent resonator modes that are generated by corresponding intensity and cycle information of the cyclic lens effect of the laser medium,
   wherein the laser medium generates a cyclic lens effect due to a refractive index distribution within the laser medium, and wherein:
   a bonding surface of the heat sink with respect to the clad has a comb structure in a cross-section perpendicular to an optical axis; and
   the refractive index distribution within the laser medium is generated by a cyclic temperature distribution caused by bonding the leading ends of the comb of the comb structure to the clad.

2. A mode control waveguide laser device comprising:
   a laser medium that is planar, has a waveguide structure in a thickness direction of a cross-section perpendicular to an optical axis, and has a cyclic lens effect in a direction perpendicular to the optical axis and the thickness direction;
   a clad that is bonded onto one surface of the laser medium; and
   a heat sink that is bonded onto one surface side of the laser medium through the clad,
   and wherein a laser oscillation comprises a laser oscillation that oscillates in a waveguide mode of the laser medium, and a laser oscillation that oscillates in a plurality of independent resonator modes that are generated by corresponding intensity and cycle information of the cyclic lens effect of the laser medium,
   wherein the laser medium generates a cyclic lens effect due to a refractive index distribution within the laser medium, and wherein:
   a bonding surface of the heat sink has a cyclic concavoconvex structure within a cross-section that is perpendicular to the optical axis, and is bonded to the clad with a bonding agent having the conductivity smaller than that of the heat sink; and the refractive index distribution within the laser medium is generated by a cyclic temperature distribution caused by a difference in the thickness of the bonding agent.

3. The mode control waveguide laser device according to claims 1 or 2, wherein the mode control waveguide laser device further comprises a nonlinear material that is disposed in the proximity of the optical axis of the laser medium, and has a waveguide structure in the same direction as that of the waveguide structure of the laser medium, and in that:

the laser oscillation that oscillates in the waveguide mode oscillates in any waveguide mode of the laser medium or the nonlinear material; and the fundamental laser beam that is inputted to the nonlinear material is converted into a laser beam that is different in wavelength.

4. The mode control waveguide laser device according to claim 3, wherein the mode control waveguide laser device further comprises a wavelength select waveguide that is disposed in the proximity of the optical axis of the nonlinear material, reflects the laser beam of a desired wavelength, and transmits other wavelengths, and in that:

the laser oscillation that oscillates in the waveguide mode oscillates in any waveguide mode of the laser medium, the nonlinear material, or the wavelength select waveguide; and the fundamental laser beam oscillates at a desired wavelength at which the wavelength select waveguide is reflected.

5. The mode control waveguide laser device according to claims 1 or 2, wherein the mode control waveguide laser device further comprises a wavelength select waveguide that is disposed in the proximity of the optical axis of the laser medium, reflects the laser beam of a desired wavelength, and transmits other wavelengths, and in that:

the laser oscillation that oscillates in the waveguide mode oscillates in any waveguide mode of the laser medium or the wavelength select waveguide; and the laser oscillation that oscillates at a desired wavelength at which the wavelength select waveguide is partially reflected.

6. The mode control waveguide laser device according to claims 1 or 2, wherein the laser medium comprises a semiconductor laser.

7. The mode control waveguide laser device according to claims 1 or 2, wherein the laser medium comprises a solid-state laser medium that is excited by a semiconductor laser disposed in the proximity of the laser medium to generate a gain.

8. The mode control waveguide laser device according to claim 1, wherein:

each of the gaps between the respective teeth of the comb structure is filled with a thermal insulation material smaller in thermal conductivity than the heat sink; and the refractive index distribution within the laser medium is generated by a cyclic temperature distribution caused by a difference in thermal conductivity between the leading ends of the comb and the thermal insulation material.

9. The mode control waveguide laser device according to claims 1 or 2, wherein the refractive index distribution within the laser medium is generated by giving a cyclic pressure to the laser medium.

10. The mode control waveguide laser device according to claims 1 or 2, wherein the clad has an absorption portion that cyclically absorbs the laser beam on the bonding surface with the laser medium, and oscillates at a desired wavelength.

11. The mode control waveguide laser device according to claims 1 or 2, wherein the clad has a cyclical refractive index change on the bonding surface with the laser medium, and oscillates at a desired wavelength.

12. The mode control waveguide laser device according to claims 1 or 2, wherein the clad is made of a material that transmits one wavelength and absorbs the other wavelengths with respect to a plurality of wavelengths at which the laser medium generates the gain, and oscillates at a desired wavelength.

13. The mode control waveguide laser device according to claims 1 or 2, wherein the laser medium has a first end surface and a second end surface that are perpendicular to the optical axis, and wherein the mode control waveguide laser device further comprises a nonlinear material that is disposed in the proximity of the optical axis of the laser medium, and has a waveguide structure in the same direction as that of the waveguide structure of the laser medium, and wherein the nonlinear material has a cross-section perpendicular to the optical axis and has a first end surface and second end surface that are perpendicular to the optical axis and the first end surface of the nonlinear material is disposed in the proximity of the second end surface of the laser medium.

14. The mode control waveguide laser device according to claim 13, wherein the first end surface of the laser medium is coated with a total reflection coating that reflects fundamental laser beam;

the second end surface of the laser medium is coated with an antireflection coating that transmits the fundamental laser beam;

the first end surface of the nonlinear material is coated with an optical coating that transmits the fundamental laser beam and reflects second harmonic laser beam; and the second end surface of the nonlinear material is coated with an optical coating that reflects the fundamental laser beam and transmits the second harmonic laser beam.

15. The mode control waveguide laser device according to claim 13, wherein the first end surface of the laser medium is coated with a total reflective coating that totally reflects the fundamental laser beam and the second harmonic laser beam, and the first end surface of the nonlinear material is coated with an antireflective coating that transmits the fundamental laser beam and the second harmonic laser beam.

16. The mode control waveguide laser device according to claim claims 1 or 2, wherein inputted fundamental laser beam is oscillated in the independent plurality of resonator modes so that second harmonic laser beam can be outputted with a predetermined efficiency.

* * * * *